US006760061B1

(12) United States Patent
Glier et al.

(10) Patent No.: US 6,760,061 B1
(45) Date of Patent: Jul. 6, 2004

(54) TRAFFIC SENSOR

(75) Inventors: Michael T. Glier, Jamestown, RI (US); Douglas L. Reilly, Naragansett, RI (US); Michael T. Tinnemeier, Providence, RI (US); Steven I. Small, Medfield, MA (US); Steven S. Hsieh, Canton, MA (US); Randall T. Sybel, Randolph, VT (US); Mark D. Laird, Milford, MA (US)

(73) Assignee: Nestor Traffic Systems, Inc., Providence, RI (US)

( * ) Notice: Subject to any disclaimer, the term of this patent is extended or adjusted under 35 U.S.C. 154(b) by 0 days.

(21) Appl. No.: 09/059,151

(22) Filed: Apr. 13, 1998

Related U.S. Application Data

(60) Provisional application No. 60/043,690, filed on Apr. 14, 1997.

(51) Int. Cl.[7] .................................................. H04N 7/18
(52) U.S. Cl. ....................... 348/149; 348/148; 348/161; 348/155; 382/104; 382/203; 382/307; 340/903; 340/907; 340/435
(58) Field of Search ................................. 348/149, 161, 348/148, 155; 382/104, 203, 307; 340/907, 903, 435, 436, 555

(56) References Cited

U.S. PATENT DOCUMENTS

| | | | |
|---|---|---|---|
| 3,149,306 A | 9/1964 | Lesher .......................... 340/41 |
| 3,196,386 A | 7/1965 | Rossi et al. .................... 340/31 |
| 3,302,168 A | 1/1967 | Gray et al. .................... 340/31 |
| 3,613,073 A | 10/1971 | Clift ............................ 340/31 |
| 3,689,878 A | 9/1972 | Thieroff ........................ 340/31 |
| 3,693,144 A | 9/1972 | Friedman ...................... 340/37 |
| 3,731,271 A | 5/1973 | Muramatu et al. ............. 340/41 |
| 3,810,084 A | 5/1974 | Hoyt, Jr. ....................... 340/341 |
| 3,825,890 A | 7/1974 | Miyazato et al. .............. 340/40 |
| 3,849,784 A | 11/1974 | Holzapfel ..................... 346/107 |
| 3,858,223 A | 12/1974 | Holzapfel ..................... 346/107 |
| 3,866,165 A | 2/1975 | Maronde et al. .............. 340/31 |
| 3,885,227 A | 5/1975 | Moissl .......................... 340/41 |
| 3,886,515 A | 5/1975 | Cottin et al. ................... 340/23 |
| 3,920,967 A | 11/1975 | Martin et al. ........... 235/150.24 |
| 3,921,127 A | 11/1975 | Narbaits-Jaureguy et al. 340/32 |
| 4,007,438 A | 2/1977 | Protonantis ................... 340/62 |

(List continued on next page.)

FOREIGN PATENT DOCUMENTS

| WO | WO94/28527 | 12/1994 |
|---|---|---|
| WO | WO 94/28527 | 12/1994 |

OTHER PUBLICATIONS

D. W. Tindall, "App,lication of Neural Network Techniques to Automatic License Plat Recognition", IEEE European convention on security and detection, 1995.

*Primary Examiner*—Shawn S. An
(74) *Attorney, Agent, or Firm*—Weingarten, Schurgin, Gagnebin & Lebovici LLP

(57) ABSTRACT

A traffic sensor system for detecting and tracking vehicles is describede. A video camera is employed to obtain a video image of a section of a roadway. Motion is detected through changes in luminance and edges in frames of the video image. Predetermined sets of pixels ("tiles") in the frames are designated to be in either an "active" state or an "inactive" state. A tile becomes active when the luminance or edge values of the pixels of the tile differ from the respective luminance or edge values of a corresponding tile in a reference frame in accordance with predetermined criteria. The tile becomes inactive when the luminance or edge values of the pixels of the tile do not differ from the corresponding reference frame tile in accordance with the is predetermined criteria. Shape and motion of groups of active tiles ("quanta") are analyzed with software and a neural network to detect and track vehicles.

17 Claims, 13 Drawing Sheets

U.S. PATENT DOCUMENTS

| | | | |
|---|---|---|---|
| 4,122,523 A | 10/1978 | Morse et al. | 364/436 |
| 4,200,860 A | 4/1980 | Fritzinger | 340/43 |
| 4,228,419 A | 10/1980 | Anderson | 340/32 |
| 4,361,202 A | 11/1982 | Minovitch | 180/168 |
| 4,371,863 A | 2/1983 | Fritzinger | 340/43 |
| 4,401,969 A | 8/1983 | Green et al. | 340/41 |
| 4,774,571 A | 9/1988 | Mehdipour et al. | 358/108 |
| 4,783,833 A * | 11/1988 | Kawabata et al. | 382/22 |
| 4,814,765 A | 3/1989 | DeRoche et al. | 340/915 |
| 4,884,072 A | 11/1989 | Horsch | 340/937 |
| 4,887,080 A | 12/1989 | Gross | 340/937 |
| 5,026,153 A | 6/1991 | Suzuki et al. | 356/1 |
| 5,041,828 A | 8/1991 | Loeven | 340/937 |
| 5,063,603 A * | 11/1991 | Burt | 382/37 |
| 5,099,322 A * | 3/1992 | Gove | 348/700 |
| 5,122,796 A * | 6/1992 | Beggs et al. | 340/904 |
| 5,161,107 A | 11/1992 | Mayeaux et al. | 364/436 |
| 5,164,998 A | 11/1992 | Reinsch | 382/65 |
| 5,257,194 A | 10/1993 | Sakita | 364/436 |
| 5,278,554 A | 1/1994 | Marton | 340/910 |
| 5,281,949 A | 1/1994 | Durley et al. | 340/433 |
| 5,283,573 A | 2/1994 | Takatou et al. | 340/937 |
| 5,285,523 A | 2/1994 | Takabashi | 395/22 |
| 5,291,563 A | 3/1994 | Maeda | 382/48 |
| 5,296,852 A * | 3/1994 | Rathi | 340/933 |
| 5,301,239 A * | 4/1994 | Toyama et al. | 382/1 |
| 5,313,201 A | 5/1994 | Ryan | 340/961 |
| 5,332,180 A | 7/1994 | Peterson et al. | 246/3 |
| 5,339,081 A | 8/1994 | Jefferis et al. | 342/28 |
| 5,345,232 A | 9/1994 | Robertson | 340/906 |
| 5,357,432 A | 10/1994 | Margolis et al. | 364/424.02 |
| 5,375,059 A | 12/1994 | Kyrtsos et al. | 364/449 |
| 5,375,250 A | 12/1994 | Van den Heuvel | 395/800 |
| 5,381,155 A | 1/1995 | Gerber | 342/104 |
| 5,387,908 A | 2/1995 | Henry et al. | 340/916 |
| 5,390,118 A | 2/1995 | Margolis et al. | 364/424.02 |
| 5,390,125 A | 2/1995 | Sennott et al. | 364/449 |
| 5,402,118 A * | 3/1995 | Aoki | 340/937 |
| 5,404,306 A | 4/1995 | Mathur et al. | 364/436 |
| 5,408,330 A | 4/1995 | Squicciarini et al. | 358/335 |
| 5,416,711 A | 5/1995 | Gran et al. | 364/436 |
| 5,432,547 A | 7/1995 | Toyama | 348/149 |
| 5,434,927 A | 7/1995 | Brady et al. | 382/104 |
| 5,440,109 A | 8/1995 | Hering et al. | 235/384 |
| 5,444,442 A | 8/1995 | Sadakata et al. | 340/916 |
| 5,448,484 A * | 9/1995 | Bullock et al. | 340/933 |
| 5,457,439 A | 10/1995 | Kuhn | 340/435 |
| 5,459,665 A | 10/1995 | Hikita et al. | 364/437 |
| 5,465,118 A * | 11/1995 | Hancock et al. | 348/396 |
| 5,467,402 A * | 11/1995 | Okuyama et al. | 382/104 |
| 5,474,266 A | 12/1995 | Koglin | 246/111 |
| 5,495,243 A | 2/1996 | McKenna | 340/902 |
| 5,509,082 A | 4/1996 | Toyama et al. | 382/104 |
| 5,530,441 A | 6/1996 | Takatou et al. | 340/937 |
| 5,535,314 A | 7/1996 | Alves et al. | 395/131 |
| 5,590,217 A * | 12/1996 | Toyama | 382/104 |
| 5,610,660 A | 3/1997 | Hamano et al. | 348/423 |
| 5,617,086 A * | 4/1997 | Klashinsky et al. | 340/907 |
| 5,687,717 A | 11/1997 | Halpern et al. | 128/630 |
| 5,708,469 A | 1/1998 | Herzberg | 348/39 |
| 5,729,216 A * | 3/1998 | Sasaki et al. | 348/135 |
| 5,734,337 A | 3/1998 | Kupersmit | 340/937 |
| 5,774,569 A | 6/1998 | Waldenmaier | 382/100 |
| 5,777,564 A | 7/1998 | Jones | 340/917 |
| 5,809,161 A * | 9/1998 | Auty et al. | 382/104 |
| 5,821,878 A | 10/1998 | Raswant | 340/907 |
| 5,829,285 A | 11/1998 | Wilson | 70/226 |
| 5,948,038 A | 9/1999 | Daly et al. | 701/117 |
| 5,999,877 A * | 12/1999 | Takahashi et al. | 348/149 |
| 6,067,075 A | 5/2000 | Pelanek | 345/158 |
| 6,075,466 A | 6/2000 | Cohen et al. | 340/933 |
| 6,091,857 A | 7/2000 | Shaw et al. | 382/251 |
| 6,111,523 A | 8/2000 | Mee | 340/937 |

* cited by examiner

Side View

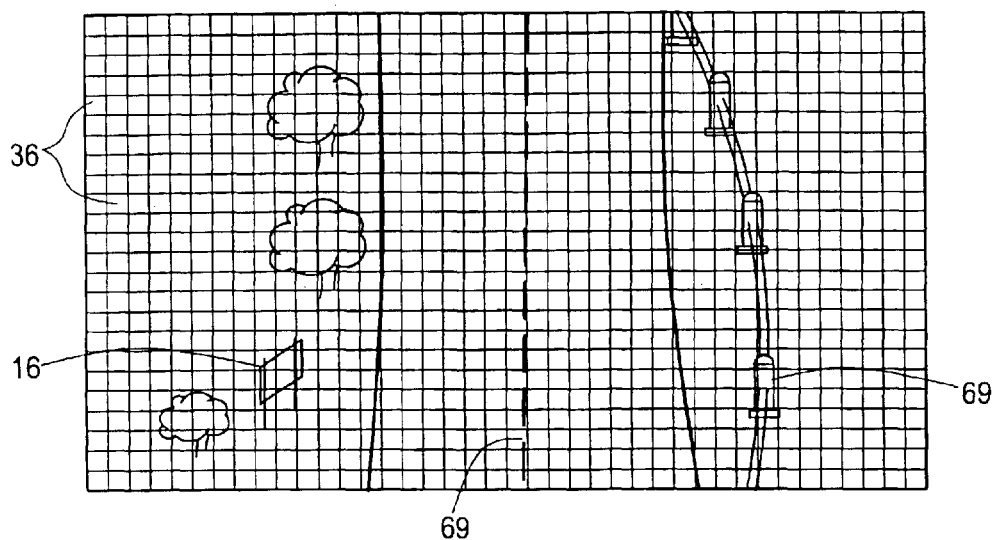
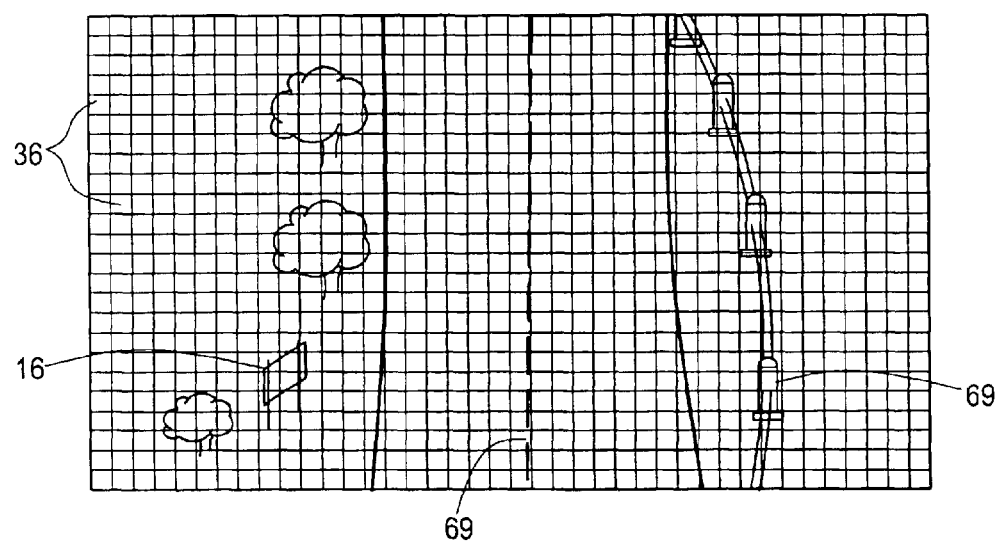
FIG. 4

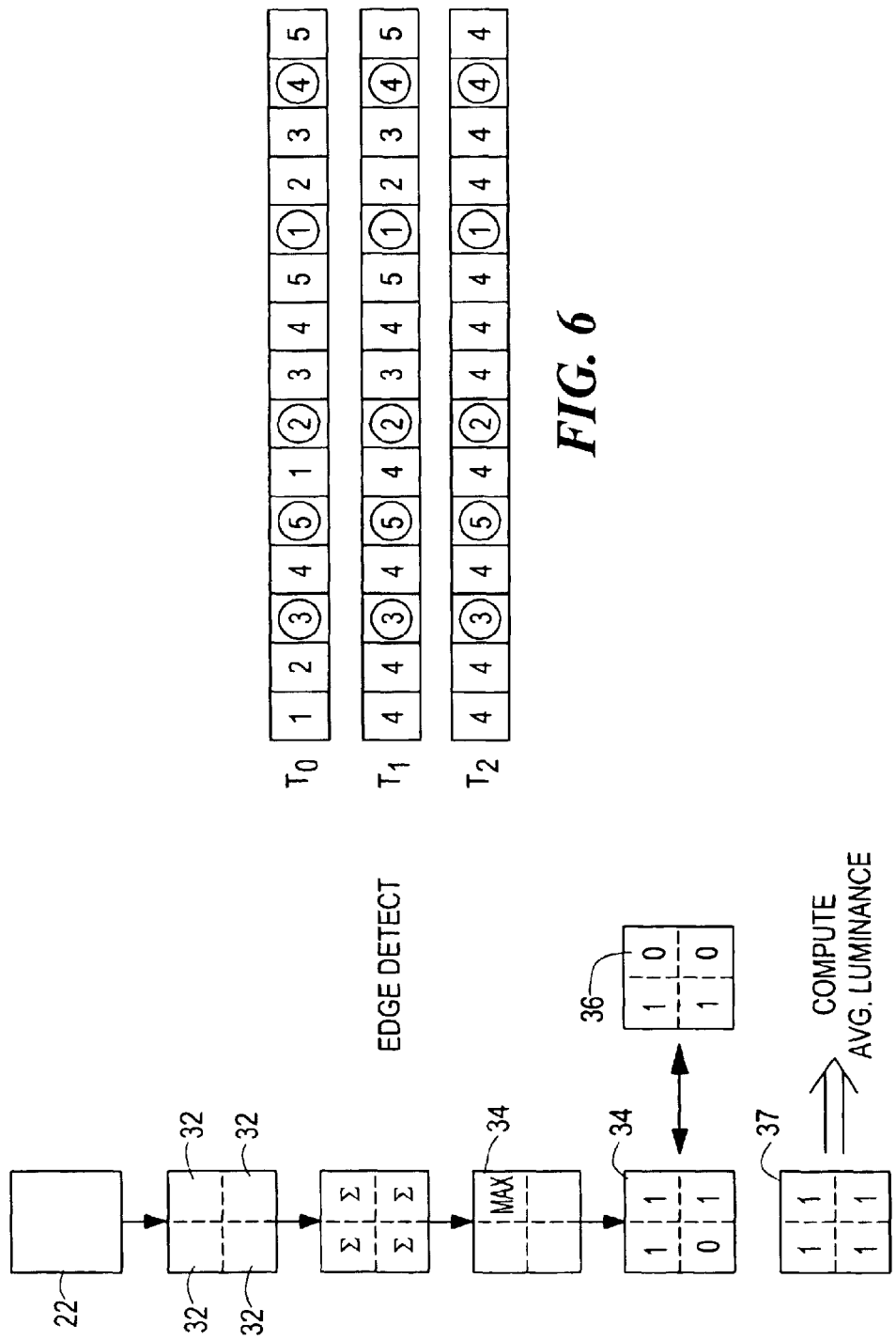

TRAFFIC SENSOR

CROSS-REFERENCE TO RELATED APPLICATIONS

A claim of priority is made to U.S. Provisional Patent Application Serial No. 60/043,690, entitled TRAFFIC SENSOR, filed Apr. 14, 1997.

STATEMENT REGARDING FEDERALLY SPONSORED RESEARCH OR DEVELOPMENT

The development of at least some of the presently disclosed subject matter may have been funded in part by the United States Government. The United States government may have rights in the invention.

BACKGROUND OF THE INVENTION

The present invention is related to traffic monitoring systems, and more particularly to a traffic monitoring system for detecting, measuring and anticipating vehicle motion.

Systems for monitoring vehicular traffic are known. For example, it is known to detect vehicles by employing inductive loop sensors. At least one loop of wire or a similar conductive element may be disposed beneath the surface of a roadway at a predetermined location. Electromagnetic induction occurs when a vehicle occupies the roadway above the loop. The induction can be detected via a simple electronic circuit that is coupled with the loop. The inductive loop and associated detection circuitry can be coupled with an electronic counter circuit to count the number of vehicles that pass over the loop. However, inductive loops are subjected to harsh environmental conditions and consequently have a relatively short expected lifespan.

It is also known to employ optical sensors to monitor vehicular traffic. For example, traffic monitoring systems that employ "machine vision" technology such as video cameras are known. Machine vision traffic monitoring systems are generally mounted above the surface of the roadway and have the potential for much longer lifespan than inductive loop systems. Further, machine vision traffic monitoring systems have the potential to provide more information about traffic conditions than inductive loop traffic monitoring systems. However, known machine vision traffic monitoring systems have not achieved these potentials.

SUMMARY OF THE INVENTION

In accordance with the present invention, a traffic monitoring station employs at least one video camera and a computation unit to detect and track vehicles passing through the field of view of the video camera. The camera provides a video image of a section of roadway in the form of successive individual video frames. Motion is detected through edge analysis and changes in luminance relative to an edge reference frame and a luminance reference frame. The frames are organized into a plurality of sets of pixels. Each set of pixels ("tile") is in either an "active" state or an "inactive" state. A tile becomes active when the luminance or edge values of the pixels of the tile differ from the luminance and edge values of the corresponding tiles in the corresponding reference frames in accordance with predetermined criteria. The tile becomes inactive when the luminance and edge values of the pixels of the tile do not differ from the corresponding reference frame tiles in accordance with the predetermined criteria.

The reference frames, which represent the view of the camera without moving vehicles, may be dynamically updated in response to conditions in the field of view of the camera. The reference frames are updated by combining each new frame with the respective reference frames. The combining calculation is weighted in favor of the reference frames to provide a gradual rate of change in the reference frames. A previous frame may also be employed in a "frame-to-frame" comparison with the new frame to detect motion. The frame-to-frame comparison may provide improved results relative to use of the reference frame in conditions of low light and darkness.

Each object is represented by at least one group of proximate active tiles ("quanta"). Individual quantum, each of which contains a predetermined maximum number of tiles, are tracked through successive video frames. The distance travelled by each quantum is readily calculable from the change in position of the quantum relative to stationary features in the field of view of the camera. The time taken to travel the distance is readily calculable since the period of time between successive frames is known. Physical parameters such as velocity, acceleration and direction of travel of the quantum are calculated based on change in quantum position over time. Physical parameters that describe vehicle motion are calculated by employing the physical parameters calculated for the quanta. For example, the velocities calculated for the quanta that comprise the vehicle may be combined and averaged to ascertain the velocity of the vehicle.

The motion and shape of quanta are employed to delineate vehicles from other objects. A plurality of segmenter algorithms is employed to perform grouping, dividing and pattern matching functions on the quanta. For example, some segmenter algorithms employ pattern matching to facilitate identification of types of vehicles, such as passenger automobiles and trucks. A physical mapping of vehicle models may be employed to facilitate the proper segmentation of vehicles. A list of possible new objects is generated from the output of the segmenter algorithms. The list of possible new objects is compared with a master list of objects, and objects from the list of possible new objects that cannot be found in the master list are designated as new objects. The object master list is then updated by adding the new objects to the object master list.

At least one feature extractor is employed to generate a descriptive vector for each object. The descriptive vector is provided to a neural network classification engine which classifies and scores each object. The resultant score indicates the probability of the object being a vehicle of a particular type. Objects that produce a score that exceeds a predetermined threshold are determined to be vehicles.

The traffic monitoring station may be employed to facilitate traffic control in real time. Predetermined parameters that describe vehicle motion may be employed to anticipate future vehicle motion. Proactive action may then be taken to control traffic in response to the anticipated motion of the vehicle. For example, if on the basis of station determined values for vehicle distance from the intersection, speed, accelleration, and vehicle class (truck, car, etc.), the traffic monitoring station determines that the vehicle will "run a red light," traversing an intersection during a period of time when the traffic signal will be otherwise be indicating "green" for vehicles entering the intersection from another direction, the traffic monitoring station can delay the green light for the other vehicles or cause some other actions to be taken to reduce the likelihood of a collision. Such actions may also include displaying the green light for the other vehicles in an altered mode (e.g., flashing) or in some combination with another signal light (e.g., yellow or red), or initiating an audible alarm at the intersection until the danger has passed. Further, the traffic monitoring station may track the offending vehicle through the intersection and record a full motion video movie of the event for vehicle identification and evidentiary purposes.

BRIEF DESCRIPTION OF THE DRAWING

The foregoing features of this invention, as well as the invention itself, may be more fully understood from the following Detailed Description of the Invention, and Drawing, of which:

FIG. 4 is a diagram of a reference frame;

FIG. 5 is a diagram that illustrates edge detect tile comparison to determine tile activation;

FIG. 6 is a diagram that illustrates adjustment of segmenter algorithm weighting;

DETAILED DESCRIPTION OF THE INVENTION

U.S. Provisional Patent Application Serial No. 60/043, 690, entitled TRAFFIC SENSOR, filed Apr. 14, 1997, is incorporated herein by reference.

Figure 1A:
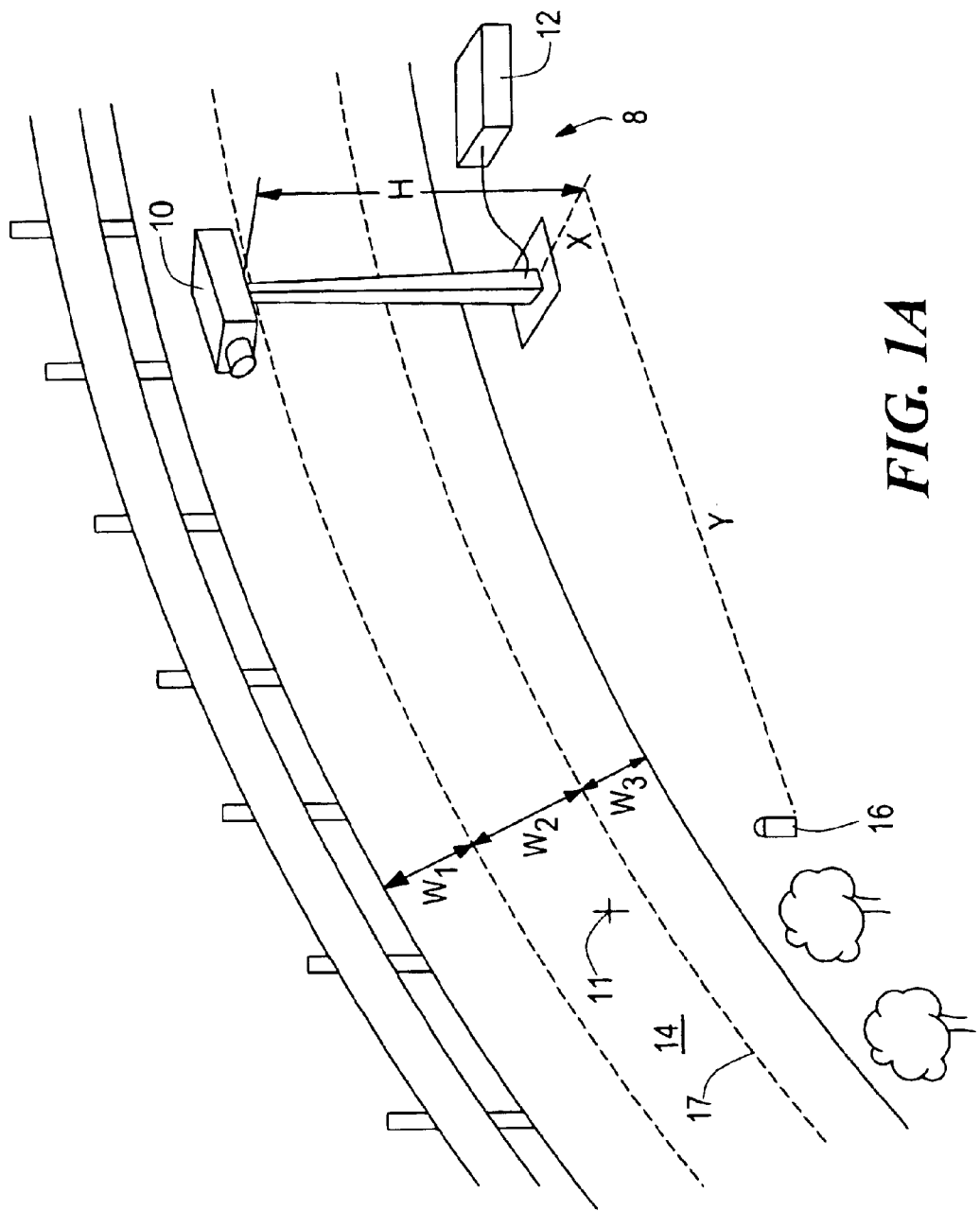
FIG. 1A is a perspective diagram of a traffic monitoring station that illustrates configuration.
Figure 1B:
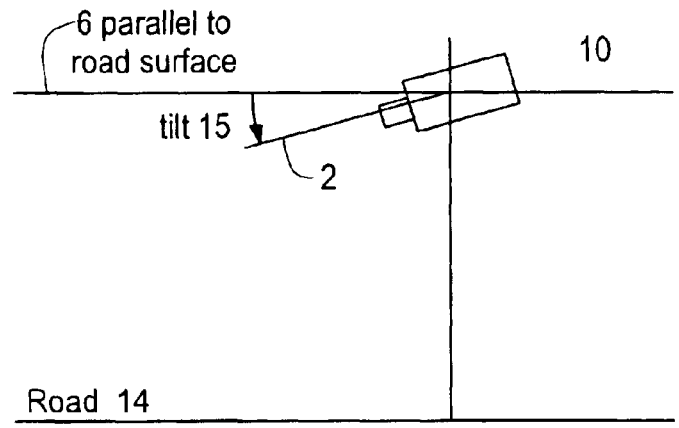
FIG. 1B is a side view diagram of a traffic monitoring station that illustrates tilt angle.
Figure 1C:
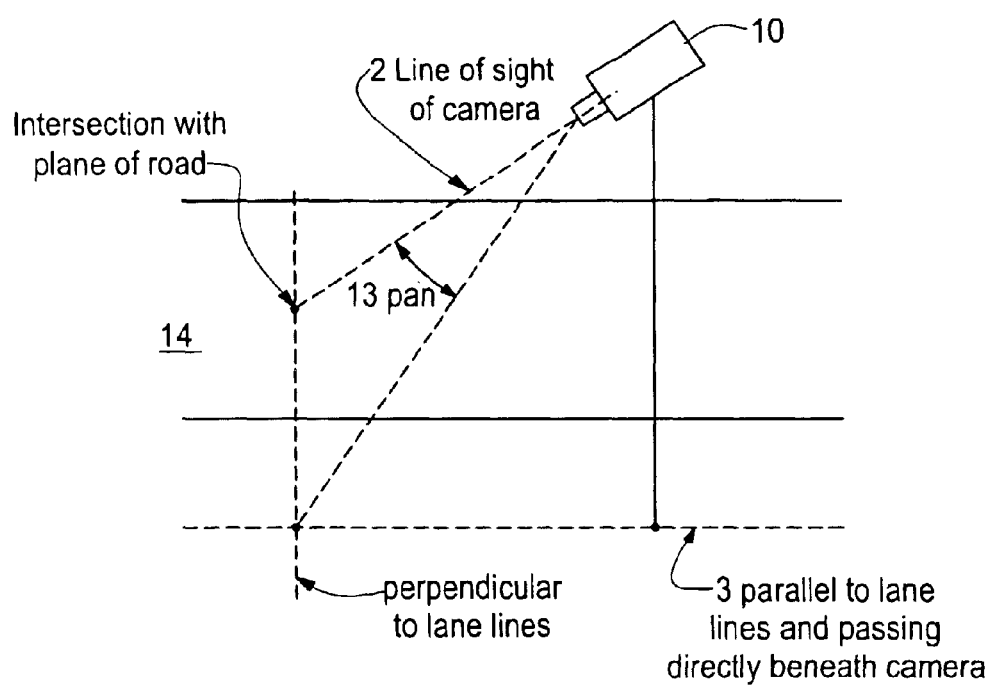
FIG. 1C is a top view diagram of a traffic monitoring station that illustrates pan angle.

Referring to FIGS. 1A, 1B and 1C, a traffic monitoring station 8 includes at least one camera 10 and a computation unit 12. The camera 10 is employed to acquire a video image of a section of a roadway 14. The computation unit 12 is employed to analyze the acquired video images to detect and track vehicles.

A three dimensional geometric representation of the site is calculated from parameters entered by the user in order to configure the traffic monitoring station 8 for operation. The position of a selected reference feature 16 relative to the camera 10 is measured and entered into memory by employing a graphic user interface. In particular, a distance Y along the ground between the camera 10 and the reference feature 16 on a line that is parallel with the lane markings 17 and a distance X along a line that is perpendicular with the lane markings are measured and entered into memory. The camera height H, lane widths of all lanes W1, W2, W3 and position of each lane in the field of view of the camera are also entered into memory. The tilt angle 15 and pan angle 13 of the camera are trigonometrically calculated from the user-entered information, such as shown in Appendix A. The tilt angle 15 is the angle between a line 2 directly out of the lens of the camera 10 and a line 6 that is parallel to the road. The pan angle 13 is the angle between line 2 and a line 3 that is parallel to the lane lines and passes directly under the camera 10. A value used for scaling ("scaler") is calculated for facilitating distance calculations. The scaler is a fixed factor for the entire image that is used for conversion between real distances and pixel displacements. Hence, the distance and direction from the camera to any point in the field of view of the camera, and the distance and direction between any two points in the field of view of the camera can be determined.

Corrections for roadway grade and bank may also be calculated during configuration. "Grade" refers to the change in height of the roadway relative to the height of the camera within the field of view of the camera. "Bank" refers to the difference in height of portions of the roadway along a line perpendicular with the lane markings. The user determines the grade and bank of the roadway and enters the determined values into memory by employing a graphic user interface. The grade and bank corrections are achieved by translating the reference plane to match the specified grade and bank.

Figure 2:
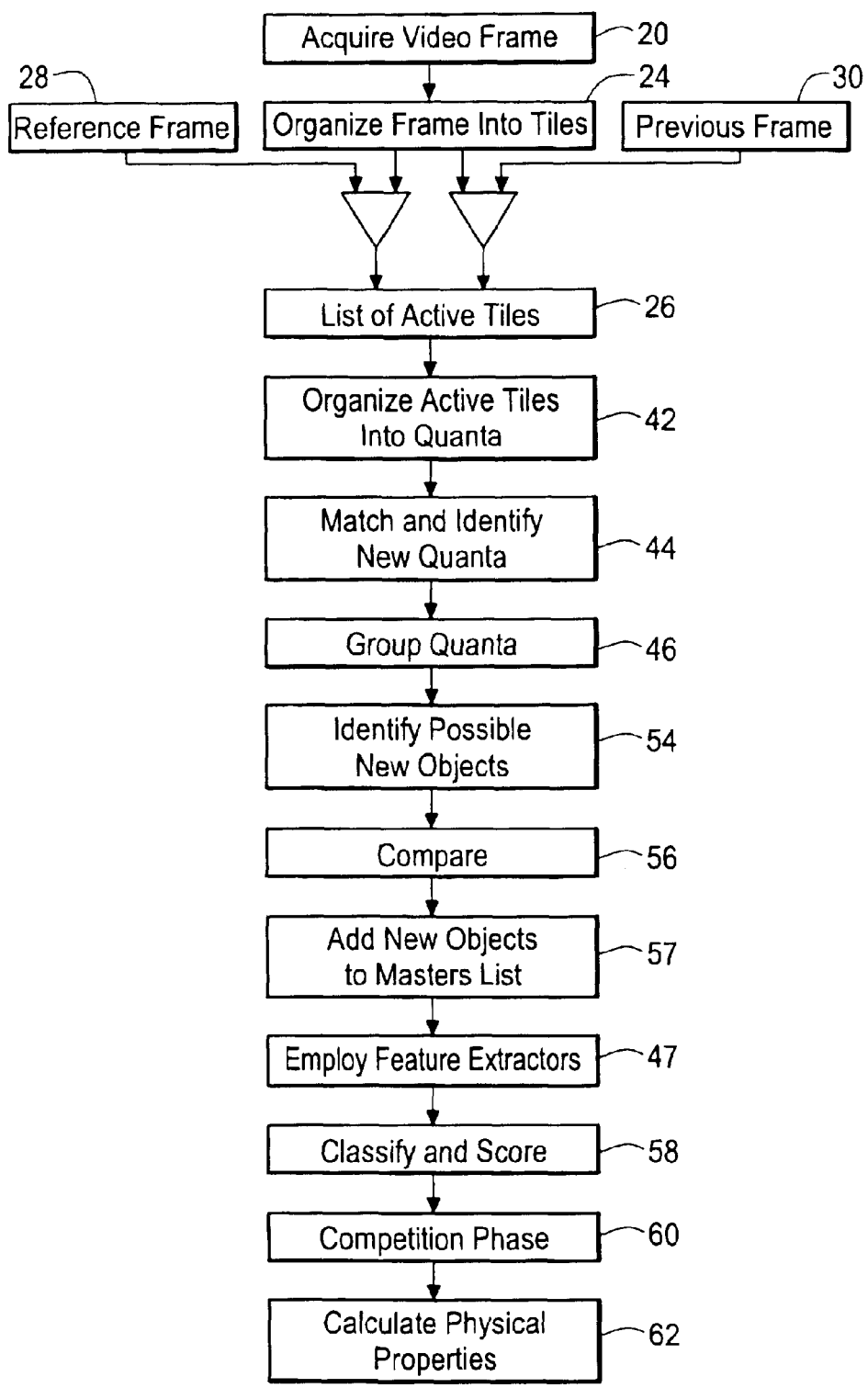
FIG. 2 is a flow diagram that illustrates the vehicle detection and tracking method of the traffic monitoring station.
Figure 3:
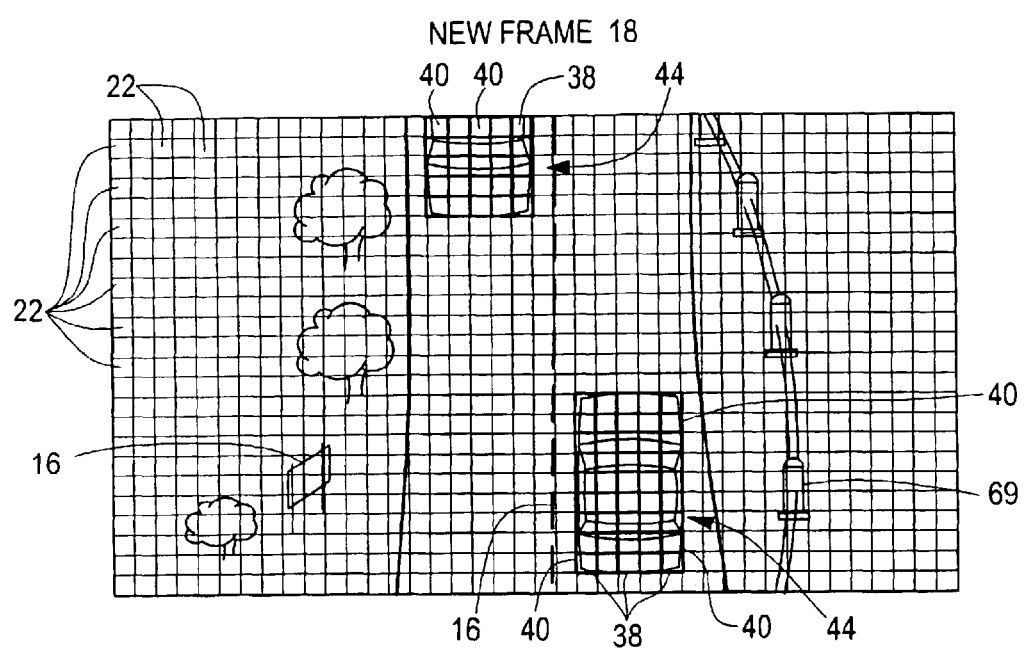
FIG. 3 is a diagram of a new frame that illustrates use of tiles and quanta to identify and track objects.

Referring to FIGS. 2 and 3, operation of the traffic monitoring station will now be described. A video frame 18 is acquired from the camera as depicted in step 20. If an interlaced camera is employed, the acquired frame is deinterlaced. If a progressive scan camera is employed then deinterlacing is not necessary. Image stabilization techniques may also be employed to compensate for movement of the camera due to wind, vibration and other environmental factors, as will be described below. The acquired frame 18 is organized into tiles 22 as depicted in step 24. Each tile 22 is a region of predetermined dimensions. In the illustrated embodiment, each frame contains 80 tiles per row and 60 tiles per column and the dimensions of each tile are 8 pixels by 8 pixels. Tile dimensions may be adjusted, may be non-square, and may overlap other tiles.

Referring to FIGS. 2, 3 and 4, a list 26 of tiles in which motion is detected ("active tiles") 38 is generated by employing either or both of reference frames 28, 29 and a previously acquired frame 30 in separate comparisons with the acquired frame 18. The reference frame 28 represents the luminance of the image from the camera in the absence of moving vehicles. The reference frame 29 represents edges detected in the image from the camera in the absence of moving vehicles. In the illustrated embodiment, both the reference frames 28, 29 and the previous frame 30 are employed. If a color camera is employed, the chrominance (color) portion of each tile 22 in the acquired frame is separated from the luminance (black and white) portion prior to comparison.

As illustrated in FIG. 5, an edge detect comparison may be employed to detect motion and activate tiles. For each tile 22 of the new frame 18 (FIG. 3), the tile is organized into four "quartiles" 32 of equal size. The pixel-luminance values in each quartile 32 are summed to provide a representative luminance value for each quartile. In the illustrated embodiment, each pixel has a luminance represented by a value from 0 to 255, where greater values indicate greater luminance. The quartile having the maximum representative luminance value is then identified and employed as a baseline for analyzing the other quartiles. In particular, the maximum luminance quartile 34 is designated to be in a first state, illustrated as logic 1. The other quartiles in the tile are designated to be in the first state if their representative luminance value exceeds a threshold defined by a predetermined percentage of the luminance value of the maximum luminance quartile 34 (lum $\geq \beta \text{lum}_{max}$). $\beta$ ("the gain") can be fixed at a specific level or may be allowed to vary based upon the characteristics of the image. Quartiles with a representative value that fails to exceed the threshold are designated to be in a second state, illustrated by logic 0. Each quartile is then compared with the corresponding quartile from the corresponding tile 36 from the reference frame 29 (FIG. 4) and, separately, the previously acquired frame. The tile 22 is designated as "eactive" if the comparison indicates a difference in the state of more than one quartile. If the comparison indicates a difference in the state of one or fewer quartiles and at least one quartile of the tile is in the second state, the tile is designated as "inactive."

In the case where each quartile 32 in the corresponding tiles of the current frame and the reference frame are designated to be in the first state a luminance activation technique is employed. A luminance intensity value is determined by summing the luminance of all pixels in the tile and dividing the sum by the total number of pixels in the tile, i.e., computing the average luminance. The average luminance of the tile is compared with the average luminance of the tile 36 in the corresponding location of the reference frame 28 and the previous frame to detect any difference therebetween. In particular, the average luminance of the reference tile is subtracted from the average luminance of the new tile to produce a difference value and, if the magnitude of the difference value exceeds a predetermined threshold, motion is indicated and the tile is designated as "active." The model using tiles, quartiles and pixels is isomorphic to a neural model of several layers.

Referring again to FIGS. 3 and 4, the reference frames 28, 29 may be either static or dynamic. A static reference frame may be generated by storing a video frame from the roadway or portion(s) of the roadway when there are no moving objects in the field of view of the camera. In the illustrated embodiment the reference frames 28, 29 are dynamically updated in order to filter differences between frames that are attributable to gradually changing conditions such as shadows. The reference frames are updated by combining each new frame 18 with the reference frames. The combining calculation may be weighted in favor of the reference frames to filter quickly occurring events, such as the passage of vehicles, while incorporating slowly occurring events such as shadows and changes in the ambient light level.

Referring to FIGS. 2 and 3, and Appendix B, active tiles 38 in the list 26 of active tiles are organized into sets of proximately grouped active tiles ("quanta") 40 as depicted by step 42. The quanta 40 are employed to track moving objects such as vehicles on successive frames. The distance travelled by each quantum is calculated based upon the change in position of the quantum from frame to frame. Matching and identifying of quantum is facilitated by a "grab phase" and an "expansion phase" as depicted by step 44. Each quantum has a shape. In the "grab phase," active tiles are sought in a predicted position that is calculated for the quantum in the new frame, within the shape defined by the quantum. The predicted position is determined by the previously observed velocity and direction of travel of the quantum. If any active tiles are located within the quantum shape region in the predicted position of the quantum in the new frame, the quantum is considered found. If no active tiles are located in the quantum shape region in the predicted position in the new frame, the quantum is considered lost. In the "expansion phase," active tiles that are adjacent to a found quantum and that have not been claimed by other quanta are incorporated into the found quantum, thereby allowing each quantum to change shape. Unclaimed active tiles are grouped together to form new quanta unless the number of active tiles is insufficient to form a quantum. If any of the quanta that have changed shape now exceed a predetermined maximum size then these "parent" known quantum are reorganized into a plurality of "children" quantum. Each child quantum inherits the characteristics of its parent quantum, such as velocity, acceleration and direction.

The identified quanta are organized into objects as depicted in step 46. The traffic sensor employs a plurality of segmenter algorithms to organize the identified quanta into objects. Each segmenter algorithm-performs a grouping, dividing or pattern matching function. For example, a "blob segmenter" groups quanta that are connected. Some segmenter algorithms facilitate identification of types of vehicles, such as passenger automobiles and trucks. Some segmenter algorithms facilitate identification of vehicle features such as headlights. Some segmenter algorithms reorganize groups of quanta to facilitate identification of features.

Referring to FIG. 6, the segmenter algorithms are employed in accordance with a dynamic weighting technique to facilitate operation under changing conditions. Five segmenter algorithms designated by numbers 1–5 are employed in the illustrative example. One segmenter algorithm is employed in each time slot. In particular, the segmenter algorithm in the time slot designated by an advancing pointer 48 is employed. When a segmenter algorithm successfully detects and tracks an object that is determined to be a vehicle by the neural network and is consistent across a plurality of frames then that segmenter algorithm is granted an additional time slot. Consequently, the segmenter algorithms that are more successful under the prevailing conditions are weighted more heavily than the unsuccessful segmenter algorithms. However, each segmenter algorithm is assigned at least one permanent time slot 50 in order to assure that each of the segmenter algorithms remains active without regard to performance. Hence, operation dynamically adjusts to changing conditions to maintain optimum performance. It should be apparent that the number of segmenters, and number and position of the time slot allocations may be altered from the illustrative example.

A list of possible new objects represented by their component quanta is generated by the segmenters as depicted by step 54. The list of possible new objects is compared with a master list of objects, and any objects from the list of possible new objects that cannot be found in the master list is designated as a new object as depicted by step 56. The object master list is updated by adding the new objects to the object master list as depicted in step 57. The objects in the updated object master list are then classified and scored as depicted in step 58.

Figure 7:
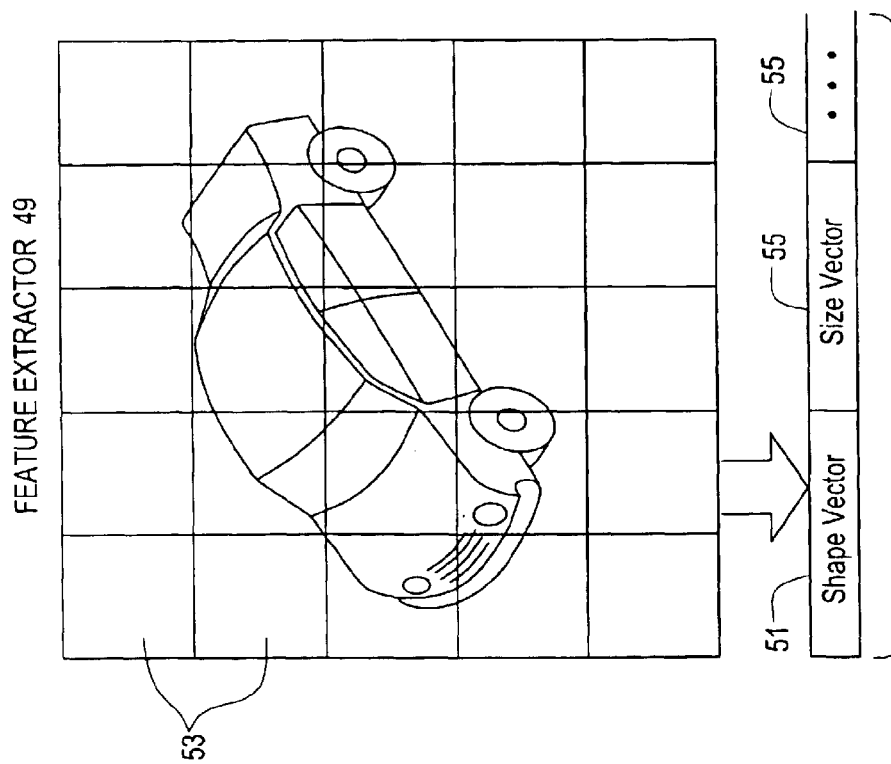
FIG. 7 is a diagram that illustrates feature vector generation by a feature extractor.

Referring to FIGS. 2 and 7, the objects in the master list are examined by employing at least one feature extractor 49 as depicted by step 47. Each feature extractor produces a vector 51 of predetermined length that describes an aspect of the object, such as shape. The illustrated feature extractor overlays the object with a 5×5 grid and generates a vector that describes the shape of the object. Because the number of cells 53 in the grid does not change, the representative vector 51 is relatively stable when the size of the object (in number of pixels) changes, such as when the object approaches or moves away from the camera. The vector 51 is concatenated with vectors 55 provided from other feature extractors, if any, to produce a larger vector. 57 that represents the object. Other grid patterns and combinations of overlays may be used to achieve improved results based upon camera position relative to the vehicles and other environmental factors.

Masking using a vehicle template may be employed to remove background information prior to feature extraction. The object is then compared with templates 136 that depict the shape of known types of vehicles such as cars, vans, trucks etc. When the best fit match is determined, the center of the object, where the center of the template is located in the match position, is marked and only portions of the object that are within the template are employed for generating-the vectors.

The descriptive vectors generated by the feature extractors are provided to a neural network classification engine that assigns a score to each object. The score indicates the probability of the object being a vehicle, including the type of vehicle, e.g., passenger automobile, van, truck. Objects that produce a score that exceeds a predetermined threshold are determined to be vehicles of the type indicated. If there are regions of overlap between objects in the updated object master list, ownership of the quanta in those regions is resolved in a competition phase as depicted in step 60. Of the objects in competition for each quantum in the overlap region, the object that was assigned the highest score by the neural network obtains ownership of the quanta.

Physical characteristics relating to object motion, such as velocity, acceleration, direction of travel and distance between objects, are calculated in step 62. The calculations are based on changes in position of a plurality of quanta from frame to frame. In particular, vehicle velocity may be calculated as the average velocity of the quanta of the vehicle, by the change in location of a specific portion of the vehicle such as the center front, or by other techniques. Similarly, vehicle acceleration may be calculated as the change in vehicle Velocity over time and vehicle direction may be calculated by extrapolating from direction of travel of quanta over a plurality of frames. The velocity, acceleration and direction of travel of the quanta are calculated based on known length and width dimensions of each pixel and the known period of time between successive frames.

Figure 8:
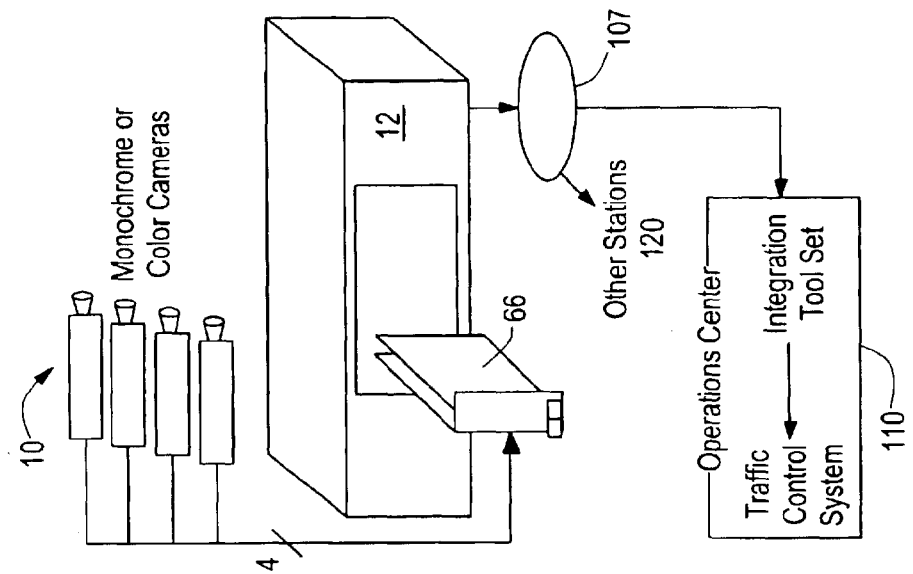
FIG. 8 is a diagram of the traffic monitoring station of FIG. 1 that illustrates the processing module and network connections.
Figure 9:
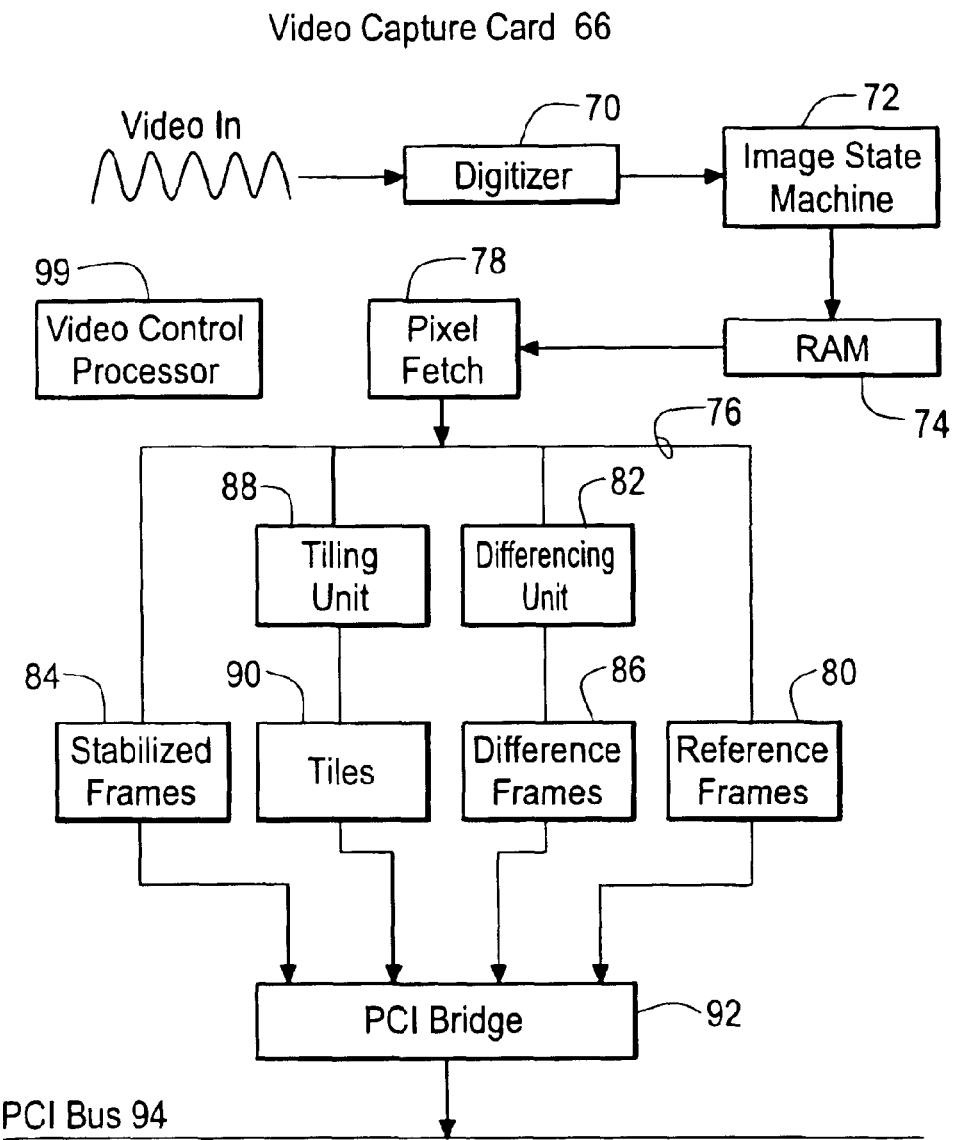
FIG. 9 is a block diagram of the video capture card of FIG. 8.

Referring to FIG. 8, the computation unit 12 includes at least one video capture card 66. The video capture card 66 performs initial processing on video signals received from the camera 10. The computation unit 12 operates on the output of the video capture card 66. The functions described with regard to the embodiment illustrated in FIGS. 8 and 9 are implemented with a custom video capture card 66. These functions may alternatively be implemented with a commercially available frame grabber and software. In the illustrative embodiment the computation unit 12 is a commercially available IBM compatible computer that employs the Windows 95 operating system. The IBM compatible computer includes a Peripheral Controller Interconnect ("FPCI") bus interface.

Referring to FIG. 9, the video capture card 66 is operative to process new video frames, establish and maintain the reference frame, and compare the new frames with the reference frame in order to ascertain luminance and/or edge differences therebetween that are indicative of motion. A digitizer circuit 70 is employed to convert the analog video signals from the camera. The camera may provide analog video signals in either National Television Standards Committee ("NTSC") format or Phase Alteration Line ("PAL") format. The chrominance portion, if any, of the video signal is separated from the luminance portion of the video signal by the digitizer circuit 70. The resulting digital signals are provided to an image state machine 72 where the video signal is deinterlaced, if necessary. In particular, the video signal is deinterlaced unless a progressive scan camera is employed. The output of the image state machine 72 is a succession of deinterlaced video frames, each frame being 640 pixels by 480 pixels in size. The image state machine is coupled to a Random Access Memory ("RAM") 74 that includes a ring of three buffers where frame data is collected prior to transmission of the frames over a digital bus 76 via pixel fetch circuitry 78.

Figure 10A:
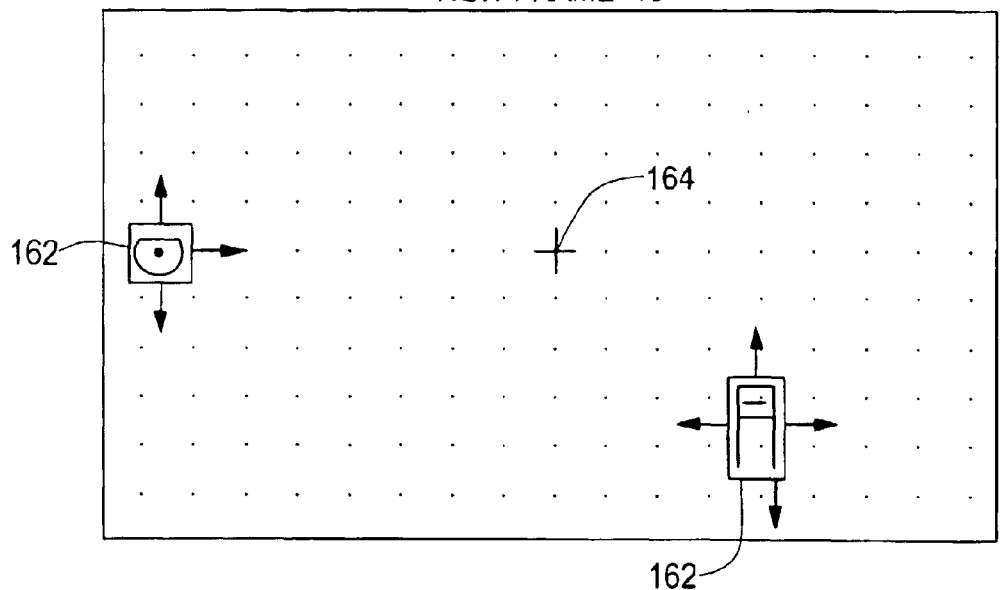
FIG. 10A is a diagram that illustrates use of the new frame for image stabilization.
Figure 10B:
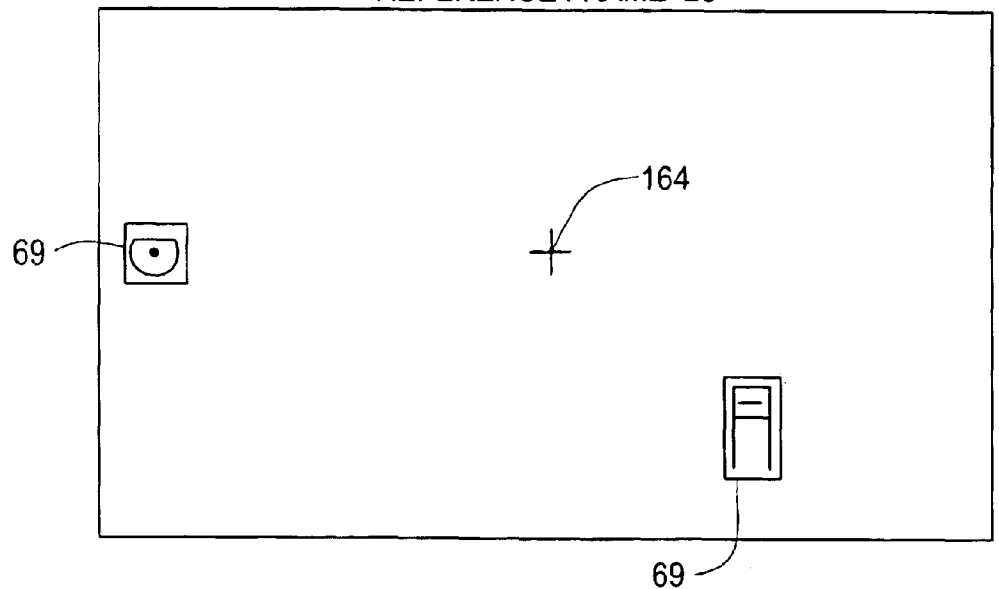
FIG. 10B is a diagram that illustrates use of the reference frame for image stabilization.

Referring to FIGS. 9 and 10, image stabilization is employed by the video control processor 99 to compensate for camera movement due to environmental factors such as wind. Up to two anchor features 69 that are identified by the user during configuration of the traffic monitoring station are employed. The location of each anchor 69 on the new frame 18 is determined, and the new frame is adjusted accordingly. Each anchor 69 is located by matching a template 162 to the image in the new frame. The template 162 is a copy of the rectangular region of the reference frame 28 that includes a representation of the anchor feature 69. A pixel by pixel comparison is made between the template 162 and a selected region of the new frame to determine whether a match has been found based on average luminance difference. The selected region of the new frame is adjusted until the best match is located (best match=$_{min}\Sigma|\text{New}_{x,y}-\text{Ref}_{x,y}|$). The first comparison may be made at the coordinates at which the anchor 69 is located in the reference frame, or at the coordinates at which the anchor was located in the previous frame. If a $_{min}\Sigma$ calculation that is less than or equal to the $_{min}\Sigma$ calculation in the previous frame is found, the location is determined to be a match, i.e., the anchor is found. If a mine calculation that is less than or equal to the $_{min}\Sigma$ calculation in the previous frame is not found, the location of the selected region is adjusted until the best match is located. The location of the selected region is adjustable within an area of up to 8 pixels in any direction from the matching coordinates of the previous frame. The selected region is shifted in turn both vertically and horizontally by a distance of four pixels to yield four $_{min}$93 calculation results. If the lowest of the four results is lower than the result at the start point, the selected region is moved to the place that yielded the lowest result. If none of the results is lower than the result at the start point, the selected region is shifted in turn both vertically and horizontally by half the original distance, i.e., by two pixels, to yield four new $_{min}\Sigma$ calculation results. If the lowest of the four results is lower than the result at the start point, the selected region is moved to the place that yielded the lowest result. The distance may be halved again to one pixel to yield four new $_{min}\Sigma$ calculation results. When the best result is found, the anchor is considered found if the result achieves a predetermined threshold of accuracy. If the best result fails to achieve the predetermined threshold of accuracy, an edge comparison is undertaken. The edge comparison is made between the template and the region that defines the best $_{min}\Sigma$ calculation results. If at least one vertical edge, at least one horizontal edge, and at least 75% of all constituent edges are matched, the anchor is considered found. Otherwise, the anchor is considered not found.

The new frame 18 is adjusted to produce a stabilized frame based upon how many anchors 69 were found, and where the anchors were found. In the event that both anchors are found and the anchors were found at the same coordinates as in the reference frame, the camera did not move and no correction is necessary. If both anchors moved by the same distance in the same direction, a two-dimensional X-Y offset vector is calculated. If both anchors moved in different directions, the camera may have zoomed and/or rotated. A zoom is indicated when the anchors have moved either towards or away from the center 164 of the image. For example, the anchors appear larger and further from the center of the image when the camera zooms in, and smaller and closer to the center of the image when the camera zooms out. In the case of a camera that is zoomed out, the image is "inflated" by periodically duplicating pixels so that the anchors appear in the expected dimensions. In the case of a camera that is zoomed in, the image is "deflated" by periodically discarding pixels so that the anchors appear in the size that is expected.

In the event that only one anchor was found, adjustment is based upon the location of that one anchor. If the anchor did not move, no correction is applied. If the previous frame was not zoomed, it is assumed that the new frame is not zoomed. If the previous frame was zoomed, it is assumed that the new frame is also zoomed by the same amount. In the event that neither anchor is found, the corrections that were calculated for the previous frame are employed.

From the number of anchors found and their positions, the video control processor 99 calculates a set of correction factors as described above and sends them to the pixel fetch circuitry 78. These correction factors include instructions for shifting the frame horizontally, vertically, or both to correct for camera pan and tilt motion, and/or directions for inflating or deflating the frame to compensate for camera zoom motion. If no correction is needed, the video control processor calculates a set of correction factors which instructs the pixel fetch circuitry to do a simple copy operation. The correction factors allow the pixel fetch circuitry to select pixels from RAM 74 for transmission on the bus 76 in stabilized order. The pixels are collected into a stabilized frame 84 for use by the computation unit 12 (FIG. 8).

Referring to FIG. 9, a differencing unit 82 employs the contents of the reference frame buffer 80 and the incoming pixels on the bus 76 to compare the reference frame with the stabilized frame, pixel by pixel, in order to determine the differences. The difference values are stored in the difference frame buffer 86. The computation unit 12 may access the difference frames over the PCI bus 94.

A tiling unit 88 is operative to organize the incoming pixels on bus 76 into tiles 22 (FIG. 3). The tiles are stored in a tile buffer 90 for use by the computation unit 12 (FIG. 8), which may access the tiles via the PCI bus 94.

Figure 11:
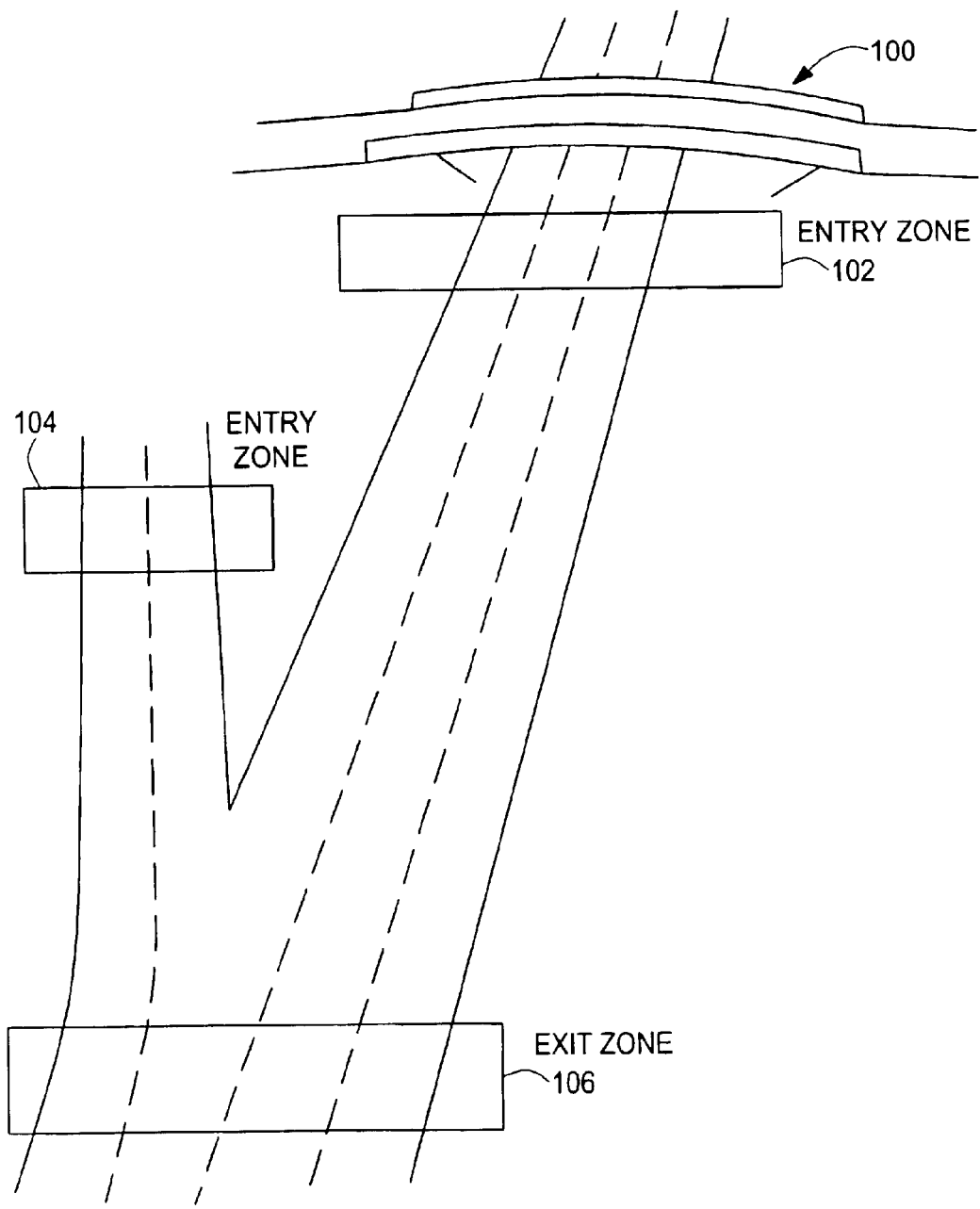
FIG. 11 is diagram of the field of view of a camera that illustrates use of entry and exit zones.

Referring to FIG. 11, user-defined zones may be employed to facilitate operation where the view of the camera is partially obstructed and where sections of roadway converge.

An entry zone is employed to designate an area of the video image in which new objects may be formed. Objects are not allowed to form outside of the entry zone. In the illustrated example, an overpass 100 partially obstructs the roadway being monitored. By placing an entry zone 102 in front of the overpass 100, undesirable detection and tracking of vehicles travelling on the overpass is avoided. A second entry zone 104 is defined for a second section of roadway within the view of the camera. Vehicles entering the roadway through either entry zone 102 or entry zone 104 are tracked. An exit zone 106 is employed to designate an area where individual vehicles are "counted." Because of the perspective of the field of view of the camera, more distant vehicles appear smaller and closer together. To reduce the likelihood of multiple vehicles being counted as a single vehicle, the number of vehicles included in the vehicle count is determined in the exit zone 106, which is proximate to the camera.

Figure 12:
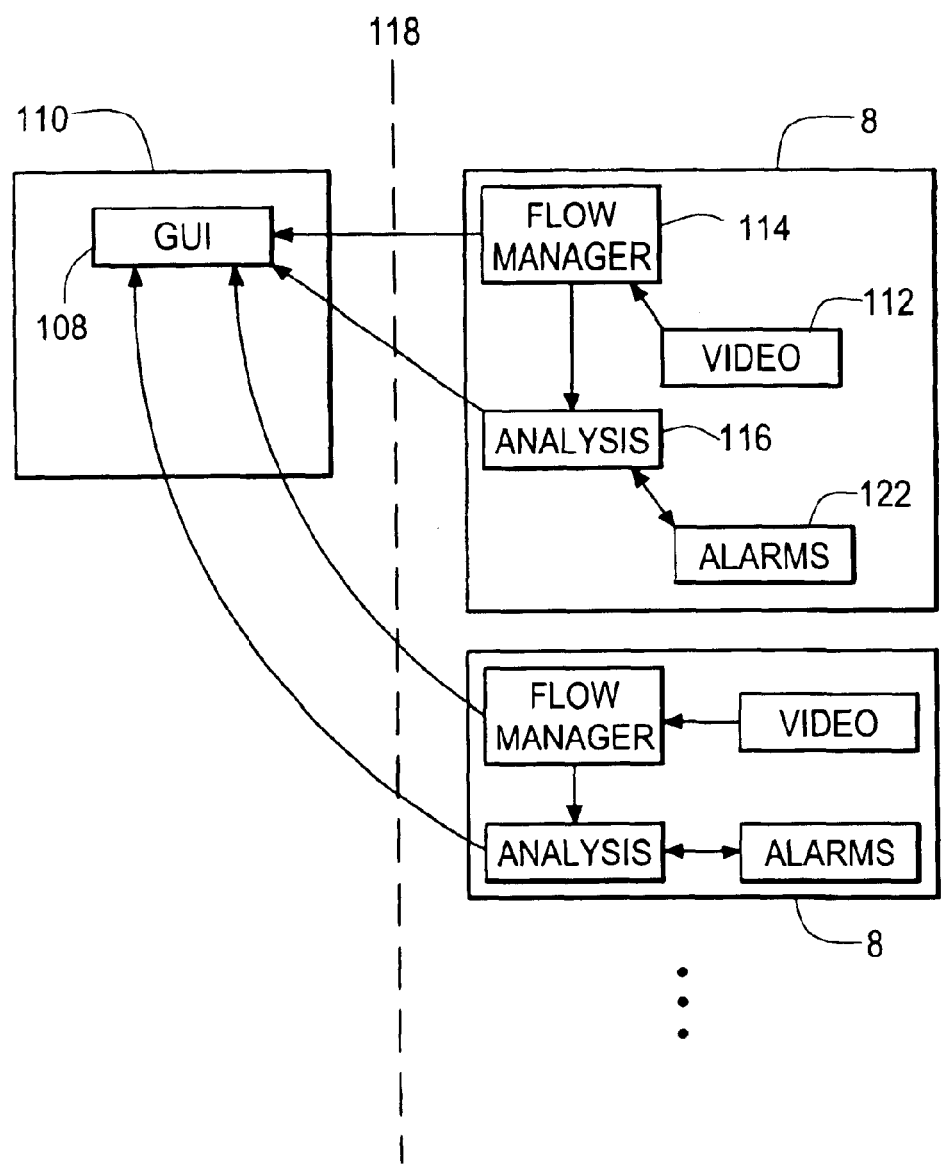
FIG. 12 is a block diagram of traffic monitoring stations networked through a graphic user interface.
Figure 13:
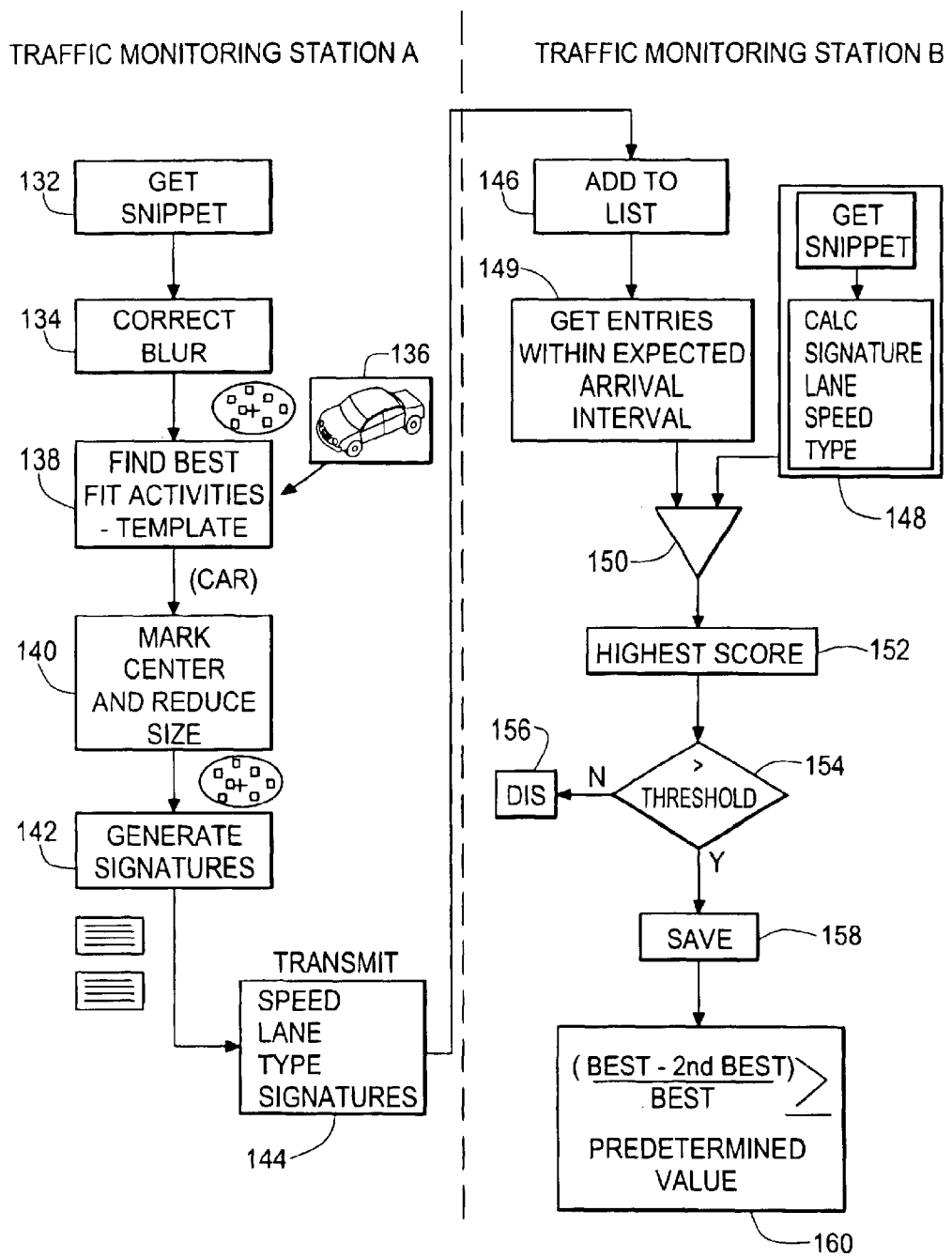
FIG. 13 is a flow diagram that illustrates station to station vehicle tracking.

Referring now to FIG. 12, a plurality of traffic monitoring stations 8 may be employed to monitor and share data from multiple sections of roadway. Information gathered from different sections of roadway may be shared via a computer network. The gathered information may be displayed on a graphic user interface 108 located at a separate operations center 110. Video images 112 from the camera are provided to the graphic user interface 108 through flow manager software 114. The flow manager maintains near actual time display of the video image through balance of video smoothness and delay by controlling buffering of video data and adapting to available bandwidth. Data resulting from statistical analysis of the video image is provided to the graphic user interface 108 from an analysis engine 116 that includes the tiling unit, segmenter algorithms and neural network described above. The controller card may be employed to transmit the data through an interface 118 to the operations center 110, as well as optional transmission to other traffic monitoring stations. The interface 118 may be shared memory in the case of a standalone monitoring station/graphic user interface combination or sockets in the case of an independent monitoring station and graphic user interface. The operations center 110 contains an integration tool set for post-processing the traffic data. The tool set enables presentation of data in both graphical and spreadsheet formats. The data may also be exported in different formats for further analysis. The video may also be displayed with an overlay representing vehicle position and type.

Alarm parameters may be defined for the data generated by the analysis engine 116. For example, an alarm may be set to trigger if the average velocity of the vehicles passing through the field of view of the camera drops below a predetermined limit. Alarm calculations may be done by an alarm engine 122 in the traffic monitoring station or at the graphic user interface. Alarm conditions are defined via the graphic user interface.

Networked traffic monitoring stations may be employed to identify and track individual vehicles to determine transit time between stations. The shape of the vehicle represented by active tiles is employed to distinguish individual vehicles. At a first traffic control station, a rectangular region ("snippet") that contains the active tiles that represent a vehicle is obtained as depicted by step 132. Correction may be made to restore detail obscured by inter-field distortion as depicted by step 134. The snippet is then compared with templates 136 that depict the shape of known types of vehicles such as cars, vans, trucks etc, as depicted in step 138. When the best fit match is determined, the center of the snippet, where the center of the template is located in the match position, is marked as depicted by step 140. Further, the size of the snippet may be reduced to the size of the matching template. First and second signatures that respectively represent image intensity and image edges are calculated from the snippet as depicted-by step 142. The signatures, matching template type, vehicle speed and a vehicle lane indicator are then transmitted to a second traffic monitoring station as depicted by step 144. The second traffic monitoring station enters the information into a list that is employed for comparison purposes as depicted in step 146. As depicted by step 148, information that represents vehicles passing the second traffic monitoring station is calculated by gathering snippets of vehicles and calculating signatures, a lane indicator, speed and vehicle type in the same manner as described with respect to the first traffic monitoring station. The information is then compared with entries selected in step 149 from the list by employing comparitor 150. In particular, entries that are so recent that incredibly high speed would be required for the vehicle to be passing the second traffic monitoring station are not employed. Further, older entries that would indicate an incredibly slow travel rate are discarded. The signatures may be accorded greater weight in the comparison than the lane indicator and vehicle type. Each comparison yields a score, and the highest score 152 is compared with a predetermined threshold score as depicted by step 154. If the score does not exceed the threshold, the "match" is disregarded as depicted by step 156. If the score exceeds the threshold, the match is saved as depicted by step 158. At the end of a predetermined interval of time, a ratio is calculated by dividing the difference between the best score and the second best score by the best score as depicted by step 160. If the ratio is greater than or equal to a predetermined value, a vehicle match is indicated. The transit time and average speed of the vehicle between traffic monitoring stations is then reported to the graphic user interface.

Inter-field distortion is a by-product of standard video camera scanning technology. An NTSC format video camera will alternately scan even or odd scan lines every 60th of a second. A fast moving vehicle will move enough during the scan to "blur," seeming to partially appear in two different places at once. Typically, the car will move about 1.5 ft during the scan (approx. 60 mph). Greater distortion is observed when the car travels at higher velocity. Greater distortion is also observed when the vehicle is nearer to the camera. The distortion compensating algorithm is based on knowledge of the "camera parameters" and the speed of the vehicle. The camera parameters enable mapping between motion lo in the real world and motion in the image plane of the camera. The algorithm predicts, based on the camera parameters and the known speed of the vehicle, how much the vehicle has moved in the real world (in the direction of travel). The movement of the vehicle on the image plane is then calculated. In particular, the number of scan lines and distance to the left or right on the image is calculated. Correction is implemented by moving the odd scan lines 'back' to where the odd scan lines would have been if the car had stayed still (where the car was when the even scan lines were acquired). For example, to move 4 scan lines back, scan line n would be copied back to scan line n−4, where n is any odd scan line. The right/left movement is simply where the scan line is positioned when copied back. An offset may be added or subtracted to move the pixels back into the corrected position. For example, scan line n may have an offset of 8 pixels when moved back to scan line n−4, so pixel 0 in scan line n is copied to pixel 7 in scan line n−4, etc. If the speed of a particular vehicle cannot be determined, the average speed for that lane may be employed to attempt the correction. Distortion correction is not necessary when a progressive scan camera is employed.

Figure 14:
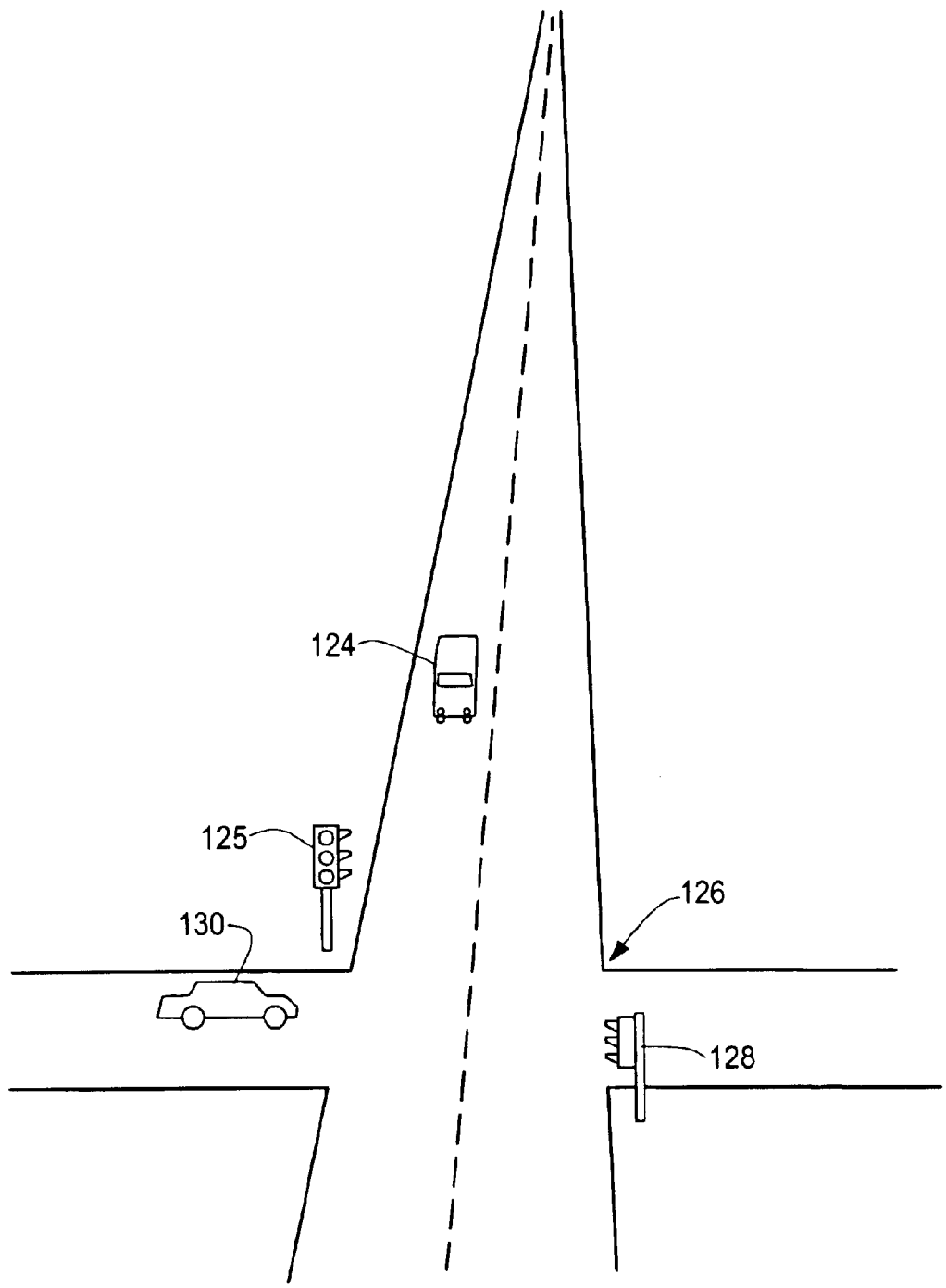
FIG. 14 is a diagram of an intersection that illustrates traffic control based on data gathered by the monitoring station.

Referring to FIG. 14, the traffic monitoring station may be employed to facilitate traffic control. In the illustrated embodiment, the traffic monitoring station is deployed such that an intersection is within the field of view of the camera. Vehicle detection can be employed to control traffic light cycles independently for left and right turns, and non-turning traffic. Such control, which would require multiple inductive loops, can be exerted for a plurality of lanes with a single camera. Predetermined parameters that describe vehicle motion are employed to anticipate future vehicle motion, and proactive action may be taken to control traffic in response to the anticipated motion of the vehicle. For example, if the traffic monitoring station determines that a vehicle 124 will "run" a red light signal 125 by traversing an intersection 126 during a period of time when a traffic signal 128 will be indicating "green" for a vehicle 130 entering the intersection from another direction, the traffic monitoring station can provide a warning or control such as an audible warning, flashing light and/or delayed green light for the other vehicle 130 in order to reduce the likelihood of a collision. Further, the traffic monitoring station may track the offending vehicle 124 through the intersection 126 and use the tracking information to control a separate camera to zoom in on the vehicle and/or the vehicle license plate to record a single frame, multiple frames or a full motion video movie of the event for vehicle identification and evidentiary purposes. The cameras are coordinated via shared reference features in a field of view overlap area. Once the second camera acquires the target, the second camera zooms in to record the license plate of the offending vehicle. The traffic monitoring station could also be used to detect other types of violations such as illegal lane changes, speed violations, and tailgating. Additionally, the traffic monitoring station can be employed to determine the optimal times to cycle a traffic light based upon detected gaps in traffic and lenghts of queues of cars at the intersection.

The determination of whether the vehicle will run the red light may be based upon the speed of the vehicle and distance of the vehicle from the intersection. In particular, if the vehicle speed exceeds a predetermined speed within a predetermined distance from the intersection it may be inferred that the vehicle cannot or is unlikely to stop before entering the intersection.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

APPENDIX A

```
short    PTLPivotSolve ( double XOffset, double YOffset,
         double Lane Width, double Lanes, double LSlope,
         double RSlope, double DiffX, double
         CameraHeight, double Grade, double Bank, double
         xPoint, double yPoint, double RealX, double
         RealY, double *LambdaSols, double *PanSols,
         double *TiltSols, double *Error, short ArraySize)
{
short    SolCount;
long     x, y;
double   Xo, Yo, LinearDistance, yP;
double   Horizon, New Horizon, dim;
double   BaseTilt, BaseLambda, BasePan, PivotX, PivotY,
         Tilt, Pan, Lambda;
CameraParams    cp;
double Scaler = 240.0;
double PI = 3.1415926535;
double RadialDistance;
SolCount = 0;
```

APPENDIX A-continued

```
cp.Height = CameraHeight;
cp.XSize = 640;
cp.YSize = 480;
cp.XCenter = 320;
cp.YCenter = 240;
cp.XOffset = (long) XOffset;
cp.YOffset = (long) YOffset;
Grade = atan ( Grade / 100.0 );
Bank = atan ( Bank / 100.0 );
cp.Grade = Grade;
cp.sinG = sin ( Grade );
Yo = CameraHeight * cp.sinG;
cp.cosG = cos ( Grade );
CameraHeight = CameraHeight * cp.cosG;
cp.Bank = Bank;
cp.sinB = sin ( Bank );
Xo = CameraHeight * cp.sinB;
cp.cosB = cos ( Bank );
CameraHeight = CameraHeight * cp.cosB;
DiffX /= Scaler;
dim = 1.0 /RSlope;
dim-= 1.0 /LSlope;
dim /= Lanes;
Horizon =-DiffX / (Lanes * dim) ;
SolCount = 0;
LinearDistance = sqrt ( ( RealX * RealX ) + (RealY * RealY ) );
BaseTilt = atan ( CameraHeight /LinearDistance );
if ( _isnan ( BaseTilt ) ) {         // Bogus solution
    return ( 0 );                    // No solutions
}
cp.st = sin(BaseTilt);
cp.ct = cos(BaseTilt);
yP = (240 - yPoint - YOffset) / Scaler;
NewHorizon = Horizon - ( yP);
BaseLambda = NewHorizon / tan (BaseTilt );
if ( _isnan ( BaseLambda ) ) {
    return ( 0 );
}
cp.Lambda = BaseLambda;
RadialDistance=sqrt ((LinearDistance*LinearDistance) + CameraHeight
*CameraHeight));
BasePan = atan (RealX / RadialDistance);
if ( _isnan ( BasePan ) ) {
    return ( 0 );
}
cp.sp = sin(BasePan);
cp.cp = cos(BasePan);
x = 640 - (long) xPoint;
y - 480 - (long) yPoint;
GetRealXY ( &cp, x, y, &PivotX, &PivotY );
// Now get the real, relocated camera parameters
LinearDistance = sqrt (( PivotX * PivotX) + ( PivotY * PivotY));
RadialDistance=sqrt ((LinearDistance*LinearDistance) + (CameraHeight
*CameraHeight));
Tilt = atan ( CameraHeight / LinearDistance );
if ( _isnan ( Tilt ) ) {             // Bogus solution
    return ( 0 );                    // No solutions
}
Lambda = (Horizon / CameraHeight) *RadialDistance;
if ( _isnan ( Lambda ) ) {           // Bogus solution
    return ( 0 );                    // No solutions
}
Pan = asin ( PivotX ) / RadialDistance );
if ( _isnan ( Pan ) ) {              // Bogus solution
    return ( 0 );                    // No solutions
}
(*LambdaSols = Lambda;
*PanSols = Pan;
*TiltSols = Tilt;
*Error = 0.0;
SolCount = 1;
return ( SolCount );
}
```

APPENDIX B

Tracker flow and pseudo code
(mtrak103, following daylight path)
(all158test2.s-included at end of document)

N.B.:
Each function call invoked is indented one tab large if, then statements are written as two sections, one beginning with IF and the other with ELSE in one case, { } is employed to enclose oce segments
T-> is employed to abbreviate tracker-> and Q-> to abbreviate quantum-> at times
arguments in function calls are generally not shown
functions generally appear in the order of their
appearance in the higher level flow

```
FRAMEPROC: : ProcessInteractiveVideo
    FRAMEPROC: :NextFrame
        MULTITEST: :ProcessFrame
            ProcessSingleFrame
                TrackTargets
                    ProcessRoad(Road=0 to Road=camera->TotalRoads)
                        Do Tracking
                            tracker->Access.Track(fn ptr to "Test2TrackTargets")
                                Generic_TrackTargets
                                    SetTime(T->CurrentTime,
                                    CurrentFrame->TimeStamp)
                                    UpdateTileModel
                                    (ShowTileActivation) (debuggingonly)
                                    SuppressLaneLines
                                    (if tracker->QuantumLaneRestriction)
                                    UpdateQuanta
                                    (ShowAllQuanta) (deguggingonly)
                                    Cleaner (elim.duplicates and stale hypotheses)
                                    FindNewTargets
                                    SortTargetList (by urgency)
                                    (makeVirtualTarget/ShowSnippet - if debug,
                                    for top "n" targets)
                                    RunTarget (for top "T->MaxClassifiesPerFrame
                                    targets, a.k.a. "n")
                                    SortTargetList
                                    CalculateActivations
                                    TargetExit (for any targets whose bounding rect
                                    overlaps exit zone)
                                    MaintainOccupancy
                                    ScanTravelingZone (scan entry zone(s)
                                    for new targets)
                        ReportTargets(if!err)
SetTime(A,B)
    copies *B to *A
UpdateTileModel
    if reference period has not yet elapsed, force all activations to 1.0
    (suppressed) and return
    switch banks of tiles (model->CurentTiles<_>model_>
    PreviousTiles) to provide current vs. previous current
    intensity=average of sampled pixels in tile
    ratio = (current intensity + model_>Damper)/(previous
    intensity+model_>Damper)
    new tile activation +=model_>Rate * (ratio - old tile activation)
SupressLaneLines
    set T_>StakesInTheGround[tile_>Index] to
    T_>FrameSignature for the following tiles in
    T_>LaneLines
    if T_>QuantumLaneRestriction==1, all
    if T_>QuantumLaneRestriction==2, tiles on odd lines
    if T_>QuantumLaneRestriction==3, tiles on every third
    row(tile>Y%3==0)
UpdateQuanta
    TrackQuanta (mature - T_>Age>=T_>TargetMaturity)
    TrackQuanta (immature - T_>Age>=T_>TargetMaturity)
        GrabTiles for all T_>Targets.Quanta (if not
        VariableFrameRate, else GrabTilesVar)
            MoveListToList (T_>TileList,T_>SeekList)
            {InsertSeekList@T_>TileList} (fn ptr to"Connect")
        move any tiles in the quantum_>SeekList that
        have trajectory that carries off screen to T_>TilePool
        {i.e. for all tiles in SeekList, check to see if
        previous, X, Y plus XVelocity, YVelocity exceed T_>Limits}
        index = tile index of NEW location (predicted by trajectory)
        IF
        tile has not been claimed for this frame
        (StakesInTheGround[index] !=T_>FrameSignature)and
```

APPENDIX B-continued

Tracker flow and pseudo code
(mtrak103, following daylight path)
(all158test2.s-included at end of document)

```
    it has the desired activation
    (Active() ==quantum_>Type), claim this tile by
    setting the frame signature for the tile to that of the
    current frame
    (T_>StakesInTheGround[index] = T_>FrameSignature)
    ELSE
    remove the tile from the SeekList (a subset of TileList)
    and back into the main body of TileList
    (including tiles that are not active)
GraceExpansion (of all quanta in T_>Targets.Quanta with
correct maturity
    ClaimTile (for each tile in a selected quantum)
        Check each adjacent tile (8 adjacent tiles,
        except if outside T_>Limits)
        If the tile has not been claimed
        (StakesInTheGround[tile_>Index} does not
        equal FrameSignature) and
        the tile is active
        (Active () == quantum_>Type), add it to the
        SeekList for this quantum and mark the tile as claimed in
        StakesInTheGround[tile_>Index]
    Return any remaining tiles in quantum_TileList
    to the TilePool
ExpandQuantum (for all quanta with correct maturity -
in T_>Target.Quanta)
    Iterate, limited by MaxHorizExpansions and
    MaxVertExpansions
    GetExpansionPermissions
    (EXP_XPOS, EXP_XNEG, EXP_YPOS, EXP_YNEG)
    based on the Permission vector, select one or
    more of the following:
    ClaimTile (x+1,y)
    ClaimTile (x-1,y)
    ClaimTile (x,y+1)
    ClaimTile (x,y-1)
    After iteration limit exceeding or nothing else
    found, move Q_>TileList to Q_>SeekList
    if any tiles claimed above, put them at the
    beginning of Q_>SeekList
if quantum_>TileList is empty, DeleteQuantum
else UpdateQuantumInfo
    update rectangle containing quantum
    update X, Y or center (tile col, row; weighted (center of mass))
    CalculateVelocity
    update quantum_>Age, if Age>QuantumMaturity, set
    Q_>Mature to 1
Active (
    initialize neur_>Firing to 0
    IF
    tile intensity (neur_>Input) is less than
    T_>Model_>MinTileIntensity, use Frame to Frame:
        {add T_>Model_>Damper to current (neur_>Input)
        and previous (neur_>Previous) intensities}
        {Calculate the ratio of the current to the previous}
        {If less than low threshold
        (T_>Model_>ThresholdLow) or greater than high
        threshold (_>ThresholdHigh)
            neur_>Firing= 1, else neur_>Firing = 0}
    ELSE
        {neur = current tile; Down = tile below current tile;
        Right=tile to right of current tile}
        {Horiz = abs ((neur_>Input - Down_>Input)/
        (neur_>Input+1))}
        {Vert = abs ((neur_>Input - Right_>Input)/
        (neur_>Input+1))}
        {if abs(Horiz - neur_>RefHoriz) >
        T_>Model_>EdgeThreshold, neur_>Firing=1}
        {if abs(Vert - nuer_>RefVertical) >
        T_>Model_>EdgeThreshold, neur_>Firing=1}
FinNewTargets
    Create new target list, NewTargets
    GroupQuantaIntoTargets (FillsNewTargets list)
    for all NEW targets:
    Set Time (target_>AcquisitionTime,
tracker_>CurrentTime)
        SendMessage(, , ,m_Start)
    MoveListToList(NewTargets, T_>Targets.Prev) add new
    target to end of list
GroupQuantaIntoTargets
    ChooseSegmenter
    run selected Segmenter (creates Blob array returns blob count)
        (DAY_SEGMENTER_1, DAY_SEGMENTER_2 or
        NIGHT_SEGMENTER, etc.)
        most, including these 3 call StandardSegmenter,
        others call TrafficMapSegmenter,
        FatQuantumBlobScan, or BigBlobSegmenter
    For each blob:
    {
    Calculate signature by summing quantum IDs from all
    quanta in blob (GetQlistSignature)
    if the signature is found in old targets (FindSig),
    mark as current (T_>LastSegmenter =
    T_>FrameSignature)
    if signature is unique (not found in old targets
    (T_>targets) or in new targets (ResultList):
    {
    LikelyTarget
        FindQListRect gets the containing rectangle for
        all quanta in the target
        Check each exit zone (expanded by
        T_>TargetFormationBuffer) to see if containing
        rectangle touches it if so, QuantaInRect checks
        each quantum individually to see if one actually
        touches the exit zone.
        If not, check to see if we require targets to be
        out of the entry zones (T_>WaitEmergence).
        If so, check to see if any part of the target is
        outside of the entry zone.
        if the target fails any test, return.
        TargetShape
    if still believe that the target is valid and new:
    {
    CompletQuantumLinks() (move a link from Link Pool to
    each target for each quantum in blob
    IF failed to get a link in completeQuantumLinks
    DELETE_target
    ELSE
    create a new target
    assign the quanta from the blob to that target
    (MoveListToList (qlist,&target_>Quanta) (qlist is
    quanta in blob) )
    Update Target
        Calculate target bounding rectangle from the
        quanta associated with the target
        Calculate a target signature by summing the associated
        quantum IDs
        Calculate target "mass" by summing the
        quantum_>Coverage of all associates quanta
        if target_>mass<=0 send message to destroy the target
    add new target to end of ResultList
    (MoveListToList (target, ResultList)
    }//target is valid and new
    }//end of signature unique
    }//end end of blob loop
StandardSegmenter
    BlobSegmenter
    Filter quanta to select day, nigh or "distressed"
    (FILTER_NIGHT KEEPS night quanta)
        BlobsFromQuanta
            get bounding rectangle containing all quanta
            zero out that area in a tile buffer used for identifying tile
            owners
            for all quanta, claim tiles in buffer by tagging them with
            the quantum # that owns them
            remove tiles along lane lines (tile and tile to its right)
        CleanUpVer3
            if active tile has 3 active neighbors, it is moved to
            image_>data
        DiagBlobScan
            create runs from image_data
```

APPENDIX B-continued

Tracker flow and pseudo code
(mtrak103, following daylight path)
(all158test2.s-included at end of document)

```
            (GetLineSegments)
            ProcessLineDiag
                scan each line from left to right starting at top
                if run does not overlap a run from previous line,
                start new blob
                if run does overlap a run from previous line, merge
                into previous blob
            AssignQuantaToBlobs
                scan image__>Data using run information from each blob
                to build a list of quanta associated with each blob
                put a pointer to the quantum list for each blob into an
                entry in BlobArray
                return the number of blobs in the array
                calculate the signature of each blob by summing the IDs
                for all quanta in that blob's quantum list
SortTargetList
            sort using tracker__>Targets__>Priority - higher priority
            targets are moved forward in the tracker's target list to the
            end of the group of targets with identical priorities
RunTarget
            increment target age (T__>Age)
            for all messages with T__>Messages__>Date<=T__>Age,
            move the messages from the target to the tracker message
            pool
            run *runner.Effector
CalculateActivations
            set all T__>Activation to 0.0
            GetTargetActivation (returns "more to do" if activation
            has not "settled")
                GetInhibition
                calculation new activation by subtracting inhibition
                from T__>Integrity
                find the difference between the new activation and the
                previous activation (T__>Activation)
                update the target activation to new activation if the change
                in activation exceeds 0.01, return 1, else return 0
            while "more to do" and loop iteration count is less than
            limit (100), iterate
            if T__>Activation<T__>ValidActivation,
            T__>Common.Vclass = 0
            if have a valid class, check to see if
            T__>ClassTotalis>minclassifies(2)
            if so, check the last class in
            T__>ClassHistory[T__>ClassIndex]
            if this class IsA Vehicle, set T__>Stable, else reset
            T__>Stable
TargetExit
            if target has already been counted, return
            IsA Vehicle (target__>Common.Vclass)
            if successful, SetLaneArrival ()
            IF still happy:
            CountTarget
            MoveListToList (T__>Messages, T__>MessagePool)
            ("let valid targets lie around a little longer, but
            message-less")
            SendMessage(. , . . . , . . ,m__MaintainFinishedTarget)
            set T__>FinalIntegrity to T__>Integrity
            set T__>Counted
            Set T__>FinalMass to T__>Mass
            ELSE
            KillTarget
            if Debug &2, EvaluateClassificationHistory and print report
MaintainOccupancy
            Subtract T__>LastOccupancyReport from T__>current time
            if the difference is greater than
            T__>OccupancyReportFrequency, set report flag
            for all lanes, emulate a loop presence detector (RunLoop)
            and, if report flag is set, RecordOccupancy
            if report flag was set, update T__>LastOccupancyReport
ReportTargets
            for each road, get the tracker for that road, the scan the list
            targets for that tracker
            for each target build a data structure with target position,
            velocity, class, land and "LinkID"
            TMCReportTarget
```

APPENDIX B-continued

Tracker flow and pseudo code
(mtrak103, following daylight path)
(all158test2.s-included at end of document)

```
TargetShaper
            This function will determine shape and score.
            DAY_SEGMENTER_1 or DAY_SEGMENTER_2:
            IF
            (T__>ShaperClassify &&T__>ShaperEnabled), get Score and
            Shape from ShaperShape ()
            if Score <T__>ShapeThreshold, return -1 (not happy)
            else return 0 (good)
            ELSE
            set Shape and Score to 0
            TestOutline
            if OK, call WidthScore to set Score.
            If Score <T__>WidthThreshold, return -1 (not happy)
            return 0 (good)
            NIGHT_SEGMENTER:
            set Score to 0 and Shape to -1
            NightVehicleSize()
            if OK, TestOutline
            if OK, set Score to 1 and Shape to 0 and return 0 (good)
            return -1 (not happy)
            DEFAULT: return 1 (shape and score not valid)
TargetPriority
            if the lane is not valid, set the reference row to the bottom
            of the screen
            if the lane is valid, se the reference row to the bottom of the
            loop for that lane (T>Loops[lane-1].Placement.y2)
            if the target is below this row, priority+=
            PRIORITY_HIGH (300)
            if the target is above this row, but less than ¼ of
            the frame height ABOVE this row, priority+=
            PRIORITY_HIGH
            if the target is between ¼ and ½ of the frame
            height ABOVE this row, priority +=
            PRIORITY_MEDIUM (200)
            if the target is farther ABOVE this row, priority +=
            PRIORITY_LOW (100)
            if the target__>Last Segmentation is 0 reduce priority by 50
            if target__>ClassTotal is odd, reduce priority by 1
ScanTravelingZone
            add zone__>Motion to top and bottom row of zone
            ScanMultiTargetZone
                if a tile in the zone has
                T__>StakesInTheGround==T__>FrameSignature, set
                that tile to 0 else set title = Active () & TileTypes
                (i.e.DAY + NIGHT)
                GreyBlobScan (creates runs of non-black pixels and
                merges into blobs)
                for all blobs:
                if a blob>Area<=zone__>ThresholdCount ignore it
                set quantum__>Type to DAY or NIGHT (copy from
                blob__>Grey)
                LinkTargetAndQuantum
                    move quantum to target; put night quantum at front of
                    list, day quantum at end of list
                    make quantum and target point to each other
                if that fails, delete quantum and return
                AddTilesFromBlob
                    scan all runs in blob, moving associated
                    tiles to specified quantum
                    quantum__>Coverage is set to number of tiles
                    quantum__>CenterX and quantum__>CenterY set to
                    geometric center of blob bounding box
                    quantum__>Rect set to Blob__>bounds
                    quantum__>StartX set to mean of left and right
                    edges of blob
                    quantum__>StartY set to bottom of blob
                    CheckQuantumSize
{LOADING MEMORY:} {memory.s} LOADSCRIPT CAT ECHO
{memory.s} LOADSCRIPT LOADSCRIPT RUN
{Recognizer} NAME
120 {ClassifyPoint} NAME
4 {ClassificationsPerFrame} NAME
{Oncoming} {RoadNames} NAME
{
    {
```

APPENDIX B-continued

Tracker flow and pseudo code
(mtrak103, following daylight path)
(all158test2.s-included at end of document)

{Test2} {Type} NAME
Tile Model Stuff
120 {RefSeconds} NAME
0 {RefSeconds} NAME {WARNING: RefSeconds=0} ECHO
100 {ReferenceUpdateCount} NAME
{0.85} FLOAT {Gain} NAME
20 {Tolerance} NAME
75 (ToleranceCutoff} NAME
{10 5 1} {EdgeHistory} NAME
{10 5 1} {IntensityHistory} NAME
{-1.5} FLOAT {Eslope} NAME
{200.0} FLOAT {Eintercept} NAME
{0.001} FLOAT {Erate} NAME
{30000.0} FLOAT {Damper} NAME
Tracker Stuff
100 {MaxTargets} NAME
{0.01} FLOAT {MinActivationDisplayed} NAME
3 {VelocityMethod} NAME
{0.5}FLOAT{MemoryDefectRate}NAME
{0.01}FLOAT{InitialIntegrity}NAME
{0.01}FLOAT(MinimalHypothesis}NAME
{0.1}FLOAT{ValidActivation}NAME
{3.0}FLOAT{wFactor}NAME
0 {WaitEntryEmergence}NAME
{0.7}FLOAT{LaneChangeSensitivity}NAME
0{ShaperClassify} NAME
1 {ShaperFill} NAME
2 {ModifyClassUsingShape} NAME
8 {QuantaWidth} NAME
8 {QuantaHeight} NAME
5 {NightQuantaWidth} NAME
5 {NightQuantaHeight} NAME
{0.4} FLOAT {QuantumWidthRatio} NAME
{0.5} FLOAT {QuantumHeightRatio} NAME
49 {SegmenterWindowSize} NAME
{1 2 3 4 5} {SegmenterList} NAME
10 {HorizontalExpansionRate} NAME
10 {NerticalExpansionRate} NAME
{0.5} FLOAT {OutlineTileRatio} NAME
4{LifeSpan} NAME
1 {Probation} NAME
8 {Class Window} NAME
{0.15} FLOAT {MinDensity} NAME
0 {MultiVehicleFilter} NAME
1 {SegmenterWeighting} NAME
{0.4} FLOAT {LoopThreshold} NAME
{-0.75} FLOAT {BadShapePenyalty} NAME
{0.20} FLOAT {SharedTargetThreshold} NAME
0 {FilterQuanta} NAME
{-1} INT{TargetFormationBuffer} NAME
0 {DiminishFinishedTargets} NAME
0 {VariableFrameRate} NAME
0 {ShaperTrafficMap} NAME
{0.0} FLOAT {FixedVehicleConfidence} NAME
3 {NightSegmenterWeight} NAME
0 {KillDayTargets} NAME
0 {SuppressDaySegmenters} NAME
{0.0}FLOAT{NightIntegrityFactor} NAME
6 {MemoryMode} NAME
{1.0} FLOAT {NightHWratio} NAME
1 {OutlineType} NAME
6 {MinVehicleSize} NAME
4 {MinTargetHeight} NAME
0 {RestrictedClassify} NAME
4 {QuantumMaturity} NAME
1 {MultiplexShapeMemory} NAME
{0.5} FLOAT {ShapeThreshold} NAME
14 {ShapeMethod} NAME
   {0.20} FLOAT {MinWidthRatio} NAME
   {0.25} FLOAT (MinHeightRatio} NAME
   (1.00} FLOAT (MaxWidthRatio} NAME
   {2.0} FLOAT {Cpower} NAME
   {0.5} FLOAT {Cadd} NAME
   {1.0} FLOAT {ShapeLeeway} NAME
1 {TargetMorphing} NAME APPENDIX B-continued Tracker flow and pseudo code
(mtrak103, following daylight path)
(all158test2.s-included at end of document)

2 {MinQuantumSize} NAME
2 {MinChildMass} NAME
1 {NightLanes} NAME
2 {QuantumLaneRestriction} NAME
0 {RepeatSegmentation} NAME
1 {UseVelocityScore} NAME
{12.0} FLOAT {MaxGapSize} NAME
{6.0} FLOAT {LoopLength} NAME
15 {MinGapStart} NAME
0 {OutsideLaneLines} NAME
0 {KeepResegments} NAME
{
  1 {NumberOfZones} NAME
  {
    ZONETYPE 4
    THRESHOLD_COUNT 1
    RECT 0 0 639 359
    NUMBER_OF_BANDS 3
  } {Zone1} NAME
} {ZoneInfo} NAME
ZoneInfoRUN
  0 0 639 479 RECT {ImageBoundary} NAME
} TRACKER {Tracker} NAME
}
{Oncoming}
NAME

What is claimed is:

1. Apparatus for detecting at least one vehicle, comprising:
at least one camera that provides a first video frame that is representative of a field of view of said camera; and
a computation unit operative to: (1) organize the first video frame and a second video frame also representative of the field of view of the camera into respective pluralities of tiles, each tile being a set of adjacent pixels having predetermined dimensions smaller than a representation of the vehicle in the first video frame, said second video frame being a reference frame representing a combination of previous frames from said camera and being updated by combining selected new frames with said combination of previous frames, said combination of previous frames being weighted more heavily than each said new frame during said update of said second video frame, (2) compare each of a plurality of tiles of the first video frame with a corresponding tile from the second video frame to detect a difference of predetermined magnitude and type,
wherein for each tile, if the difference of predetermined magnitude and type is detected, then the tile is in a first state, and if the difference of said predetermined magnitude and type is not detected, then the tile is in a second state, and (3) determine whether a plurality of proximate tiles are in said first state, such a determination indicating that the vehicle is present in the field of view of said camera at a current position represented by said plurality of proximate tiles.

2. The apparatus of claim 1 wherein said second video frame represents a single selected previous frame from said camera.

3. The apparatus of claim 1 wherein said computation unit employs at least one segmenter algorithm to identify at least one feature from each of said plurality of proximate tiles in said first state.

4. The apparatus of claim 1 wherein said computation unit includes a classification engine that is employed to match patterns defined by said plurality of proximate tiles with known patterns to produce a score that indicates a probability that said plurality of proximate tiles represents a vehicle.

5. The apparatus of claim 4 wherein a roadway is within the field of view of said camera and said computation unit adjusts the mapping of video frames to compensate for the grade of the roadway.

6. The apparatus of claim 4 wherein a roadway is within the field of view of said camera and said computation unit adjusts the mapping of video frames to compensate for the bank of the roadway.

7. The apparatus of claim 4 wherein a velocity of said at least one vehicle is calculated from a change in position of the vehicle from said first video frame to said second video frame.

8. The apparatus of claim 7 wherein an anticipated future motion for said at least one vehicle is calculated from said calculated velocity.

9. The apparatus of claim 1 wherein a first zone is defined in said first video frame, and new vehicles that are identified outside of said first zone are disregarded.

10. The apparatus of claim 1 wherein a second zone is defined in said first video frame, and a number of vehicles passing by the camera is determined from the portion of the image within said second zone.

11. The apparatus of claim 1 wherein said difference of predetermined magnitude and type is an edge detection difference calculated by comparing edges in each of said tiles in said first video frame with edges in each said corresponding tiles in said second video frame.

12. The apparatus of claim 1, wherein said difference of predetermined magnitude and type is a luminance difference, wherein the luminance difference is calculated by comparing the average pixel luminance in each tile in said first video frame with average pixel luminance in the corresponding tile in said second video frame.

13. The apparatus of claim 1 wherein at least one feature in said first and second video frames is employed to align the first video frame with the second video frame.

14. The apparatus of claim 1 wherein said computation unit comprises a video capture card.

15. The apparatus of claim 1 wherein said computation unit comprises a frame grabber and software.

16. The apparatus of claim 1 wherein said computation unit comprises a personal computer.

17. The apparatus of claim 1 wherein said computation unit is operative to detect a plurality of vehicles by determining whether corresponding pluralities of proximate tiles are in said first state indicating that the vehicles are present in the field of view of said camera, each said plurality of proximate tiles representing a current position of the corresponding vehicle in the field of view of said camera.

* * * * *

UNITED STATES PATENT AND TRADEMARK OFFICE
CERTIFICATE OF CORRECTION

PATENT NO. : 6,760,061 B1
APPLICATION NO. : 09/059151
DATED : July 6, 2004
INVENTOR(S) : Michael T. Glier et al.

It is certified that error appears in the above-identified patent and that said Letters Patent is hereby corrected as shown below:

Title page, (75), line 2, "Naragansett" should read --Narragansett--;

Title page, Abstract (57), line 1, "describede" should read --described--;

Title page, Abstract (57), line 13, delete "is";

Column 5, line 20, "eactive" should read --active--;

Column 7, line 64, "("FPCI")" should read --("PCI")--;

Column 8, line 43, "mine calculation" should read --$_{min}\Sigma$ calculation--;

Column 8, line 50, "$_{min}$93 calculation" should read --$_{min}\Sigma$ calculation--;

Column 11, line 43, delete "lo";

Column 14, line 27, Appendix B, "(deguggingonly)" should read --(debuggingonly)--;

Column 14, line 30, Appendix B, "makeVirtualTarget/" should read --MakeVirtualTarget/--;

Column 14, line 49, Appendix B, "[tile_$_{>Index}$]" should read --[tile_>Index]--;

Column 14, line 51, Appendix B, "==1" should read --= =1--;

Column 14, line 52, Appendix B, "==2" should read --= =2--;

Column 14, line 53, Appendix B, "==3" should read --= =3--;

Column 14, line 54, Appendix B, "==0" should read --= =0--;

Column 14, line 57, Appendix B, "Age>=T_>" should read --Age<T_>--;

Column 15, line 7, Appendix B, "==quantum" should read --= =quantum--;

Column 15, line 21, Appendix B, "==quantum" should read --= =quantum--;

Column 16, line 67, Appendix B, "image-data" should read --image_>data--;

UNITED STATES PATENT AND TRADEMARK OFFICE
CERTIFICATE OF CORRECTION

PATENT NO. : 6,760,061 B1
APPLICATION NO. : 09/059151
DATED : July 6, 2004
INVENTOR(S) : Michael T. Glier et al.

It is certified that error appears in the above-identified patent and that said Letters Patent is hereby corrected as shown below:

Column 17, line 63, Appendix B, "targets" should read --of targets--;

Column 19, line 36, Appendix B, "Nertical" should read --Vertical--; and

Column 19, line 44, Appendix B, "Penyalty" should read --Penalty--.

Signed and Sealed this

Twenty-fourth Day of October, 2006

JON W. DUDAS
*Director of the United States Patent and Trademark Office*